United States Patent
Yu et al.

(10) Patent No.: US 12,353,689 B2
(45) Date of Patent: Jul. 8, 2025

(54) DATA PROCESSING METHOD AND APPARATUS FOR VIRTUAL SCENE, ELECTRONIC DEVICE, AND STORAGE MEDIUM

(71) Applicant: Tencent Technology (Shenzhen) Company Limited, Shenzhen (CN)

(72) Inventors: Lijun Yu, Shenzhen (CN); Yaoran Zhong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/972,429

(22) Filed: Oct. 24, 2022

(65) Prior Publication Data

US 2023/0043203 A1 Feb. 9, 2023

Related U.S. Application Data

(63) Continuation of application No. PCT/CN2021/101740, filed on Jun. 23, 2021.

(30) Foreign Application Priority Data

Jul. 30, 2020 (CN) .......................... 202010749969.4

(51) Int. Cl.
*G06F 3/04842* (2022.01)
*A63F 13/497* (2014.01)
(Continued)

(52) U.S. Cl.
CPC ........ *G06F 3/04842* (2013.01); *A63F 13/497* (2014.09); *A63F 13/86* (2014.09);
(Continued)

(58) Field of Classification Search
CPC .... G06F 3/04842; G06F 9/461; A63F 13/355; A63F 13/493; A63F 13/52; A63F 2300/554; H04L 67/131
See application file for complete search history.

(56) References Cited

U.S. PATENT DOCUMENTS 9,131,339 B1 * 9/2015 Kulfan .................. H04W 8/245
9,381,432 B2 * 7/2016 Justice .................. A63F 13/355
(Continued)

FOREIGN PATENT DOCUMENTS

CN 103888440 A 6/2014
CN 106964153 A 7/2017
(Continued)

OTHER PUBLICATIONS

Reddit, "Cannot join this quest because you have not progressed enough in the story." https://www.reddit.com/r/MonsterHunterWorld/comments/f6ntwa/cannot_join_this_quest_because_you_have_not/ (Feb. 19, 2020) (Year: 2020).*
(Continued)

*Primary Examiner* — Justin R. Blaufeld
(74) *Attorney, Agent, or Firm* — Morgan, Lewis & Bockius LLP

(57) ABSTRACT

This application provides a method for processing data associated with a virtual scene. The method includes: receiving a save request for progress data of the virtual scene; the save request being generated in a process in which a target user performs a virtual scene operation on the virtual scene, and being used for requesting to save progress data corresponding to current operation progress of the virtual scene operation; generating, based on the save request, an archive file used for indicating the operation progress of the virtual scene operation; generating and storing, based on the archive file, a data snapshot of the progress data corresponding to the operation progress; and returning the data snap-
(Continued)

shot in a case of receiving an acquiring request for the progress data of the operation progress, so as to present, based on the data snapshot, a picture of the virtual scene corresponding to the operation progress.

20 Claims, 24 Drawing Sheets

(51) Int. Cl.
    *A63F 13/86*         (2014.01)
    *A63F 13/355*       (2014.01)
    *A63F 13/493*       (2014.01)
    *A63F 13/52*         (2014.01)
    *H04L 67/131*      (2022.01)

(52) U.S. Cl.
    CPC .......... *A63F 13/355* (2014.09); *A63F 13/493* (2014.09); *A63F 13/52* (2014.09); *A63F 2300/5533* (2013.01); *A63F 2300/554* (2013.01); *H04L 67/131* (2022.05)

(56) References Cited

U.S. PATENT DOCUMENTS

| | | | | |
|---|---|---|---|---|
| 2007/0015118 | A1* | 1/2007 | Nickell | G09B 7/02 434/118 |
| 2008/0090650 | A1* | 4/2008 | Tarantino | A63F 3/00157 463/25 |
| 2010/0190555 | A1* | 7/2010 | Dutilly | A63F 13/52 463/43 |
| 2012/0004026 | A1* | 1/2012 | Vann | G06Q 30/02 463/25 |
| 2012/0185762 | A1* | 7/2012 | Ozer | G06F 40/197 715/255 |
| 2012/0220377 | A1* | 8/2012 | Cantor | A63F 13/795 463/42 |
| 2013/0260896 | A1* | 10/2013 | Miura | A63F 13/47 463/42 |
| 2014/0179426 | A1* | 6/2014 | Perry | A63F 13/86 463/31 |
| 2014/0179427 | A1* | 6/2014 | Miura | A63F 13/69 463/31 |
| 2014/0200083 | A1* | 7/2014 | Tabata | A63F 13/822 463/42 |
| 2016/0184712 | A1* | 6/2016 | Colenbrander | A63F 13/49 463/29 |
| 2017/0087464 | A1* | 3/2017 | Perry | A63F 13/352 |
| 2017/0246537 | A1* | 8/2017 | Edstrom | A63F 13/795 |
| 2018/0318716 | A1* | 11/2018 | Benedetto | A63F 13/5378 |
| 2019/0066530 | A1* | 2/2019 | Lee | G06F 3/00 |
| 2019/0240577 | A1* | 8/2019 | Oshima | A63F 13/46 |
| 2022/0203235 | A1* | 6/2022 | Perry | A63F 13/537 |

FOREIGN PATENT DOCUMENTS

| | | | | |
|---|---|---|---|---|
| CN | 107659655 | A | * 2/2018 | ............ A63F 13/35 |
| CN | 108654092 | A | 10/2018 | |
| CN | 110368686 | A | 10/2019 | |
| CN | 110489382 | A | 11/2019 | |
| CN | 110869096 | A | 3/2020 | |
| CN | 111054067 | A | 4/2020 | |
| CN | 111084983 | A | 5/2020 | |
| CN | 111111214 | A | 5/2020 | |
| CN | 111240544 | A | 6/2020 | |
| CN | 111420397 | A | 7/2020 | |
| CN | 111917768 | A | 11/2020 | |
| EP | 2853299 | A1 | 4/2015 | |
| JP | 2002011249 | A | 1/2002 | |
| JP | 2018023409 | A | 2/2018 | |

OTHER PUBLICATIONS

Anonymous, "Screenshot Savedgame", Dec. 22, 2014, XP093054650, 3 pgs., Retrieved from the Internet: https://www.visionaire-studio.net/forum/thread/screenshot-savedgame/.
Tencent Technology, Extended European Search Report and Supplementary Search Report, EP21850408.2, Jun. 22, 2023, 10 pgs.
Tencent Technology, ISR, PCT/CN2021/101740, Sep. 10, 2021, 2 pgs.
Tencent Technology, WO, PCT/CN2021/101740, Sep. 10, 2021, 5 pgs.
Tencent Technology, IPRP, PCT/CN2021/101740, Jan. 31, 2023, 6 pgs.
Tencent Technology, Japanese Office Action, JP Patent Application No. 2022-555629, Jun. 20, 2023, 10 pgs.
Tencent Technology, Japanese Office Action, JP Patent Application No. 2022-555629, Oct. 17, 2023, 5 pgs.
Tencent Technology, European Office Action, EP Patent Application No. 21850408.2, Mar. 13, 2024, 5 pgs.

* cited by examiner

New archive

*Archive name [Please enter archive name]

*Game [Enter the name of the game to search]

*Archive file [Upload]

Android archive path [The archive path of the game in an Android phone, such as :/data/com.and.games505/file]

*Archive description [Describe the archive file, for example, whether the playbook is required, whether the archive file belongs to all-mission archive files, or how the archive file is used, up to 150 words]

[Cancel] [OK]

FIG. 9A

Add a snapshot

\*Snapshot name: Please enter the snapshot name, for example, xx game - xx mission - xx snapshot.

\*Game: FIFA Football World--Experience

\*Snapshot description: Please enter a snapshot description (it is recommended to give a simple name for distinction, up to 30 words)

\*Snapshot policy:

| Types | Entity | Operation |

Playbook ▼ | Enter the playbook name to search | ◀ ▶ | 🗑

Archive ▼ | Enter the archive name to search | ◀ ▶ | 🗑

New

Cancel  OK

FIG. 9B

DATA PROCESSING METHOD AND APPARATUS FOR VIRTUAL SCENE, ELECTRONIC DEVICE, AND STORAGE MEDIUM

CROSS-REFERENCE TO RELATED APPLICATIONS

This application is a continuation application of PCT Patent Application No. PCT/CN2021/101740, entitled "DATA PROCESSING METHOD AND APPARATUS FOR VIRTUAL SCENE, AND ELECTRONIC DEVICE AND STORAGE MEDIUM" filed on Jun. 23, 2021, which claims priority to Chinese Patent Application No. 202010749969.4, filed with the State Intellectual Property Office of the People's Republic of China on Jul. 30, 2020, and entitled "VIRTUAL SCENE PROCESSING METHOD AND DEVICE AND COMPUTER READABLE STORAGE MEDIUM", all of which are incorporated herein by reference in their entirety.

FIELD OF THE TECHNOLOGY

This application relates to an electrical digital data processing technology and a cloud technology, and in particular, to a data processing method and apparatus for a virtual scene, an electronic device, and a computer readable storage medium.

BACKGROUND OF THE DISCLOSURE

Based on a display technology of graphics processing hardware, a channel for perceiving an environment and acquiring information is extended, and especially a display technology of a virtual scene can implement intelligent interaction between persons, a person and various virtual objects in the virtual scene according to an actual application requirement. A virtual scene uses screen display of a device, and obtains a visual perception effect similar to a real world by using a stereo display technology. Typically, a stereo display technology such as stereo projection, virtual reality, and an augmented reality technology is used for outputting various virtual scenes. A game is a typical application of a virtual scene display technology. A user may run the game by using a device. In a virtual scene outputted by the device, a game object controlled by the user cooperates with another game object on the line to fight or combat with each other.

Cloud gaming, also referred to as gaming on demand, is an online gaming technology based on the cloud computing technology. The cloud gaming technology enables a thin client with relatively limited graphics processing and data computing capabilities to run a high-quality game. In a cloud gaming scenario, the game is run on the cloud server rather than a game terminal of a player, and the cloud server renders the game scenario into a video and audio stream, and transmits the video and audio stream to the game terminal of the player by using the network. The game terminal of the player is not required to have powerful graphics computing and data processing capabilities, but only required to have a basic streaming media playback capability and the capability of acquiring instructions inputted by the player and sending the instructions to the cloud server.

In a process of a user experiencing a virtual scene such as a game, to continue to experience operation progress corresponding to the virtual scene such as game continuation, a related technology performs local archiving or cloud archiving on the operation progress corresponding to the virtual scene. However, a local archiving manner has high migration costs, a cloud archiving manner relies on developer access, and archiving efficiency is low.

SUMMARY

Embodiments of this application provide a data processing method and apparatus for a virtual scene, an electronic device, and a computer readable storage medium, so that progress data corresponding to current operation progress can be stored in a process of performing a virtual scene operation, thereby improving progress data storage efficiency.

The technical solutions in the embodiments of this application are implemented as follows:

an embodiment of this application provides a data processing method for a virtual scene, where the method is performed by a server and includes: receiving a save request for progress data of the virtual scene;

the save request being generated in a process in which a target user performs a virtual scene operation on the virtual scene, and being used for requesting to save progress data corresponding to current operation progress of the virtual scene operation;

generating, based on the save request, an archive file used for indicating the operation progress of the virtual scene operation;

generating and storing, based on the archive file, a data snapshot of the progress data corresponding to the operation progress; and returning the data snapshot in a case of receiving an acquiring request for the progress data of the operation progress, so as to present, based on the data snapshot, a picture of the virtual scene corresponding to the operation progress.

An embodiment of this application provides a data processing method for a virtual scene, where the method is performed by an electronic device and includes:

receiving, in a process in which a target user performs a virtual scene operation on the virtual scene, a save instruction used for saving progress data corresponding to current operation progress of the virtual scene operation;

transmitting a save request for the progress data to a server in response to the save instruction, so that the server generates, based on the save request, an archive file used for indicating the operation progress of the virtual scene operation, and generates and stores, based on the archive file, a data snapshot of the progress data corresponding to the operation progress;

transmitting an acquiring request for the progress data corresponding to the picture to the server in a case of receiving a picture display instruction for the operation progress, so that the server acquires and returns, based on the acquiring request, a data snapshot of the progress data corresponding to the operation progress; and receiving the returned data snapshot, and presenting, based on the data snapshot, a picture of the virtual scene corresponding to the operation progress.

An embodiment of this application provides a data processing apparatus for a virtual scene, where the apparatus includes:

a request receiving module, configured to receive a save request for progress data of the virtual scene;

the save request being generated in a process in which a target user performs a virtual scene operation on the virtual scene, and being used for requesting to save progress data corresponding to current operation progress of the virtual scene operation;

a file generation module, configured to generate, based on the save request, an archive file used for indicating the operation progress of the virtual scene operation;

a snapshot generation module, configured to generate and store, based on the archive file, a data snapshot of the progress data corresponding to the operation progress; and a snapshot returning module, configured to: return the data snapshot in a case of receiving an acquiring request for the progress data of the operation progress, so as to present, based on the data snapshot, a picture of the virtual scene corresponding to the operation progress.

An embodiment of this application provides a data processing apparatus for a virtual scene, where the apparatus includes:

an instruction receiving module, configured to: receive, in a process in which a target user performs a virtual scene operation on the virtual scene, a save instruction used for saving progress data corresponding to current operation progress of the virtual scene operation;

a first transmitting module, configured to: transmit a save request for the progress data to a server in response to the save instruction, so that the server generates, based on the save request, an archive file used for indicating the operation progress of the virtual scene operation, and generates and stores, based on the archive file, a data snapshot of the progress data corresponding to the operation progress;

a second transmitting module, configured to: transmit an acquiring request for the progress data corresponding to the picture to the server in a case of receiving a picture display instruction for the operation progress, so that the server acquires and returns, based on the acquiring request, a data snapshot of the progress data corresponding to the operation progress; and a picture presentation module, configured to: receive the returned data snapshot, and present, based on the data snapshot, a picture of the virtual scene corresponding to the operation progress.

An embodiment of this application provides an electronic device, including:

a memory, configured to store executable instructions; and a processor, configured to: when executing the executable instructions stored in the memory, implement the data processing method for a virtual scene provided in this embodiment of this application.

An embodiment of this application provides a computer readable storage medium that stores executable instructions, and the executable instructions are configured to be executed by a processor, so as to implement the data processing method for a virtual scene provided in the embodiment of this application.

The embodiments of this application have the following beneficial effects:

In a process in which a target user performs a virtual scene operation on a virtual scene, a server receives a save request for progress data of the virtual scene, and generates, based on the save request, an archive file used for indicating operation progress of the virtual scene operation; generates and stores, based on the archive file, a data snapshot of the progress data corresponding to the operation progress; and when an acquiring request for the progress data of the operation progress transmitted by a terminal is received, returns a data snapshot to the terminal, so that the terminal presents, based on the data snapshot, a picture of the virtual scene corresponding to the operation progress. In this way, in a process of performing the virtual scene operation by the user, the server may complete generation and storage of the data snapshot corresponding to the operation progress, thereby improving progress data storage efficiency. In addition, when the user requests progress data corresponding to the operation progress, the server may directly return the stored data snapshot corresponding to the operation progress to the terminal, so that continuation of a corresponding virtual scene picture can be implemented without developer access, thereby improving progress data display efficiency.

BRIEF DESCRIPTION OF THE DRAWINGS

FIG. 9A to FIG. 9C are schematic diagrams of a management interface according to an embodiment of this application.

DESCRIPTION OF EMBODIMENTS

Figure 1A:
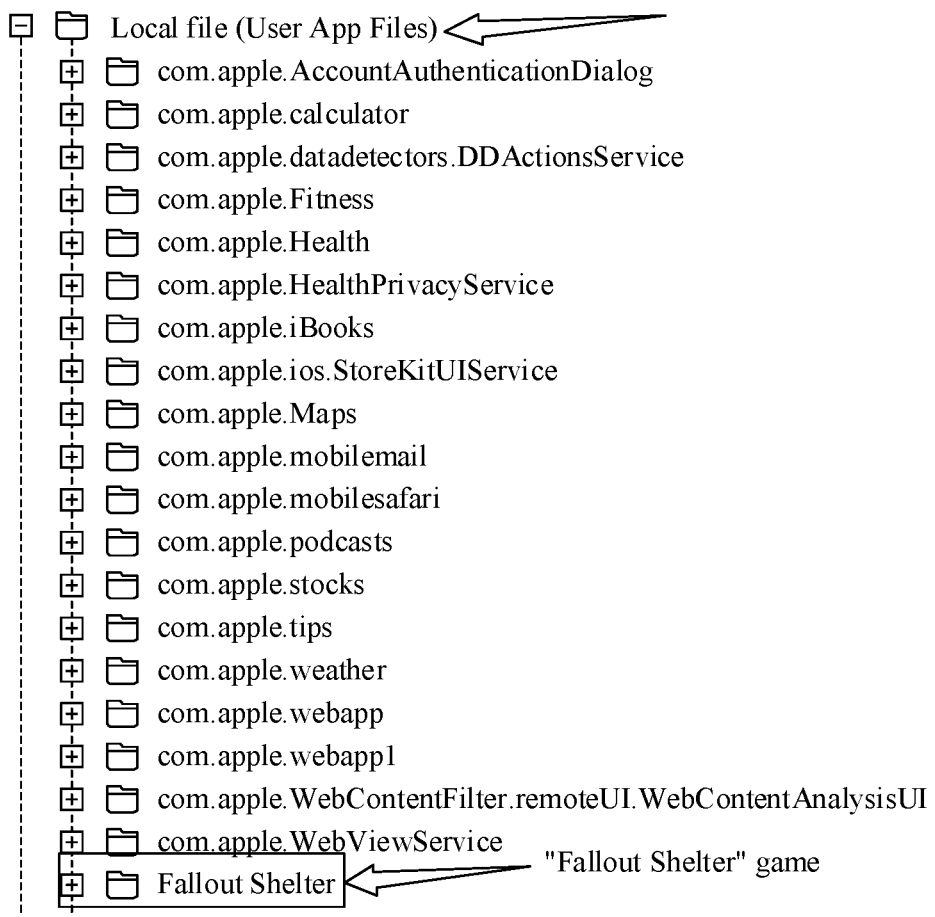
FIG. 1A and FIG. 1B are schematic diagrams of an archive file according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second/third . . . " is merely intended to distinguish similar objects but does not necessarily indicate a specific order of an object. It may be understood that "first/second/third . . . " is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as that usually understood by a person skilled in the technical field to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

(1) A client is an application program running in a terminal that is used for providing various services, such as a video playback client, an instant messaging client, a live streaming client, and a game client.

2) "In response to" is used for representing a condition or status on which one or more operations to be performed depend. When the condition or status is satisfied, the one or more operations may be performed immediately or after a set delay. Unless explicitly stated, there is no limitation on the order in which the plurality of operations are performed.

(3) A virtual scene is a scene that is different from a real world and that is outputted by a device, and visual perception of the virtual scene can be formed by using naked eyes or device assistance, for example, a two-dimensional image outputted by a display screen, and a three-dimensional image outputted by using a stereo display technology such as stereo projection, virtual reality, and an augmented reality technology. In addition, a variety of perception simulating the real world such as auditory perception, tactile perception, olfactory perception, and motion perception can be further formed by using a variety of possible hardware.

(4) A cloud game is a game manner based on cloud computing. All games run on a server side, and are transmitted to a player in a manner of pushing a stream (also referred to as a cloud game audio-video stream) through a network by compressing a rendered game picture and audio effect, and the player operates the game on a remote server by using the network.

(5) An archiving system is a system setting for saving and reading game progress. Not all games have the archiving system. Archiving systems of different games also have different forms. The archiving systems of stand-alone games and online games are also different concepts.

6) Archive file: Archive files of some games (mainly stand-alone games) will exist in a local mobile phone or a local computer in the form of files. A player can find an archive file location to find the archive file itself.

(7) Open archiving. When playing a game, a player taps/clicks an archive button in a game menu (or an archive point in a scene) and archives it in time to generate an available archive file.

8) Cloud archiving is archiving progress stored in cloud. Generally, cloud and local archiving progress is consistent, which may also be referred to as "open archiving on cloud".

(9) Game continuation: Regardless whether a game is restarted, switched over, or in standby mode, after the game is exited, the next time you enter the game, you can continue previous game progress and continue a previously interrupted game task.

(10) A playbook is a virtual function component used for adjusting operation progress corresponding to a virtual scene, for example, a tool combination of producing game content (virtual tap/click, pre-load, and image recognition).

(11) A snapshot is a set of technical means for generating game content (a playbook, an archive file, and the like are combined and configured), and is bound to a specific game, and specifically serves cloud trial play (game segment trial play) or cloud game continuation play.

(12) Publish: Before a cloud game/snapshot goes online, a point that is dependent on another module is associated, and a generated data snapshot is pushed to a terminal, so as to present a corresponding picture on the terminal.

(13) A cloud game operation support system (OSS) maintains cloud game data and processes logic related to all configurations and parameters of a cloud game (snapshot).

(14) A service background is a background used in operation management content and can used for configuration and operations such as snapshot on/off and association with a video.

The following uses a game as an example to analyze a data processing solution of a virtual scene provided by a related technology to implement game continuation. In a related technology, operation progress of a game is locally archived. For a stand-alone game, operation progress stored in an archive file is progress of a mission game or progress of a game plot, and an archive file of operation progress of a game is stored locally. For example, FIG. 1A is a schematic diagram of an archive file according to an embodiment of this application. In FIG. 1A, operation progress file of the Fallout Shelter game is used as an example to store an operation progress file of the game in a local file (user app files). However, there are at least the following problems in this local archiving manner:

(1) Migration costs are high and the archive file may be damaged. The archive file is stored in the local file of a terminal such as a mobile phone or a computer. If there is no archive file on another terminal when a player uses the another terminal for the game, the archive file needs to be manually migrated from the original terminal to the terminal after replacement. If a player plays the same stand-alone game on a different mobile phone, the local archive needs to be used for handling archive synchronization. However, the archive file may be damaged during an archive migration process.

(2) Problem of archiving and backup: Because there is no fixed location or absolute path for storing archive files of different games, it takes a lot of time to find a storage location when archive files after each game change need to be found.

(3) Archive files are often tampered with, resulting in developers being unprofitable, impacting developers' enthusiasm, and destroying game content ecology.

(4) An archive file is large and occupies a specific storage space. In addition, the archive file is still available after the game is uninstalled. In this case, the local storage space needs to be cleared to free up the storage space.

Figure 1B:
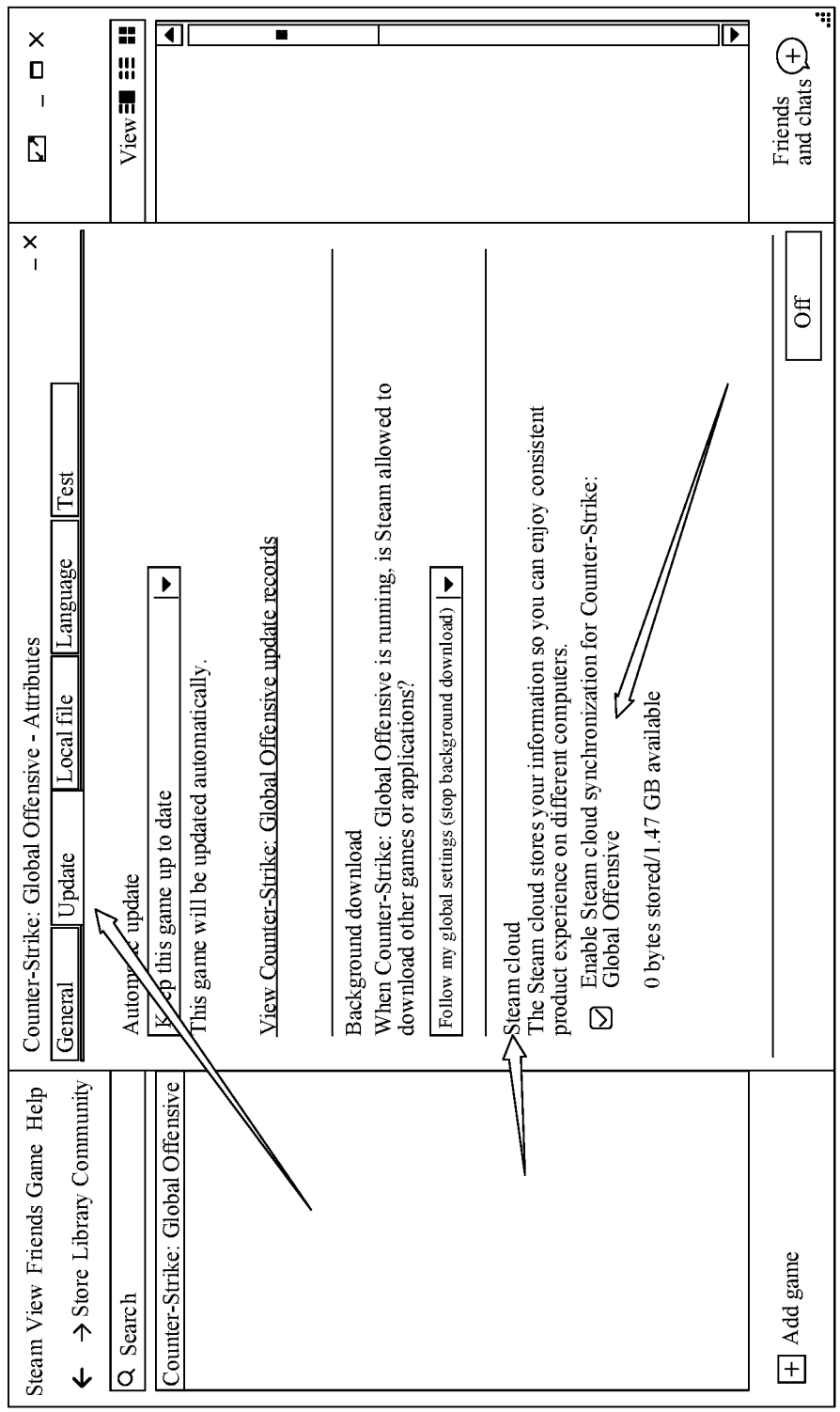

The related technology further stores, in a cloud archiving manner, the archive file of the game operation progress to the cloud. A player plays a game on a terminal such as a computer or a mobile phone, and stores an archive file of game operation progress in a cloud server of a game mall such as Steam or Wegame. For example, FIG. 1B is a schematic diagram of an archive file according to an embodiment of this application. In FIG. 1B, an example in which the game Counter-Strike: Global Offensive is used, and an archive file on operation progress of the game is stored in a Steam cloud server. However, there are at least the following problems in this cloud archiving manner:

(1) Dependent on developer access, that is, a developer needs to access a software development kit (SDK). If the developer does not access the SDK, cloud archiving is not supported. Therefore, a quantity of games supported by the cloud archiving type is limited. For example, all games of the manufacturer "Ubisoft" in the Steam mall do not support cloud archiving in the Steam mall.

(2) There are some limitations, such as loss of local archive due to synchronization failure and lack of support for old games. Non-platform games downloaded from some websites do not support cloud archiving.

(3) Cloud archiving does not guarantee 100% storage completion. In many cases, there is no prompt for cloud archiving completion or it is impossible to check integrity of cloud archiving.

(4) Cloud archiving provides a limited archive space for a user. For example, a PlayStation 4 (PS4) provides only a 1G cloud archiving space for a player.

In view of this, embodiments of this application provide a data processing method and apparatus for a virtual scene, and a computer readable storage medium. In a process in which a target user performs a virtual scene operation on a virtual scene, archive files related to operation progress of a virtual scene running on a cloud server are stored on the cloud server, continuation of a picture corresponding to the virtual scene can be implemented without migration and without developer access, and development costs are low. To facilitate easier understanding of the data processing method for a virtual scene provided in the embodiments of this application, an example implementation scenario of the data processing method for a virtual scene provided in the embodiments of this application is first described. The virtual scene may be outputted entirely based on a terminal device or based on collaboration between a terminal device and a server.

Figure 2A:
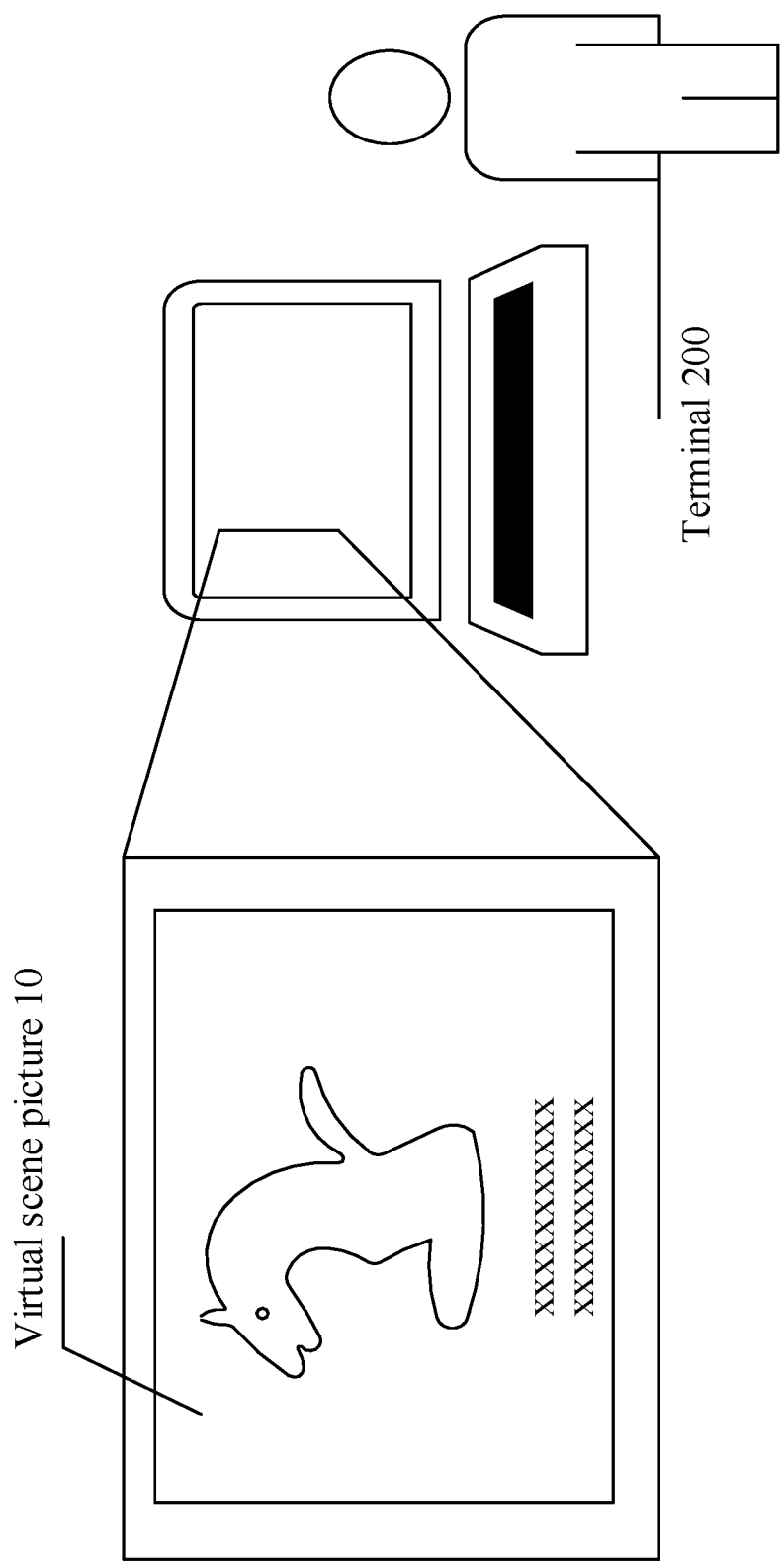
FIG. 2A and FIG. 2B are schematic diagrams of an application mode of a data processing method for a virtual scene according to an embodiment of this application.

In an implementation scenario, FIG. 2A is a schematic diagram of an application mode of a data processing method for a virtual scene according to an embodiment of this application, and is applicable to some application modes that completely depend on a computing capability of a terminal 200 to complete related data computing of a virtual scene, for example, a game in a stand-alone version/offline mode, and an output of the virtual scene is completed by using the terminal 200 such as a smartphone, a tablet computer, and a virtual reality/augmented reality device.

When visual perception of the virtual scene is formed, the terminal 200 computes, by using graphic computing hardware, data required for display, completes loading, parsing, and rendering of display data, and outputs, in graphic output hardware, a picture or a video that can form visual perception of the virtual scene, for example, presents a two-dimensional picture or a video on a display screen of a smartphone, or projects, on a lens of augmented reality/ virtual reality glasses, a picture or a video that implements a three-dimensional display effect. In addition, to enrich the perception effect, the device may also use different hardware to form one or more of auditory perception, tactile perception, and motion perception.

As an example, the terminal 200 runs a game application, and receives a save request for progress data of the game when the game application runs; where the save request is generated in a process in which a target user performs an operation on the game, and is used for requesting to save progress data corresponding to current operation progress of the operation; generates, based on the save request, an archive file used for indicating the operation progress of the operation; generates and stores, based on the archive file, a data snapshot of the progress data corresponding to the operation progress; and when an acquiring request for the progress data of the operation progress is received, returns a data snapshot, and presents a game picture 10 corresponding to the operation progress based on the data snapshot, so as to continue to play a game according to previous game progress, and continue a game task interrupted previously.

As another example, the terminal 200 is installed with a virtual tourism application, and receives a save request for progress data of virtual tourism when the virtual tourism application runs; where the save request is generated in a process in which a target user performs an operation on the virtual tourism, and is used for requesting to save progress data corresponding to current operation progress of the operation; generates, based on the save request, an archive file used for indicating the operation progress of the operation; generates and stores, based on the archive file, a data snapshot of the progress data corresponding to the operation progress; and when an acquiring request for the progress data of the operation progress is received, returns a data snapshot, and presents a tourism picture 10 corresponding to the operation progress based on the data snapshot, so as to continue to tour according to previous tourism progress, and continue a tourism task interrupted previously.

As another example, the terminal 200 is installed with a shopping application, and receives a save request for progress data of the shopping application when the shopping application runs; where the save request is generated in a process in which a target user performs an operation on the shopping application, and is used for requesting to save progress data corresponding to current operation progress of the operation; generates, based on the save request, an archive file used for indicating the operation progress of the operation; generates and stores, based on the archive file, a data snapshot of the progress data corresponding to the operation progress; and when an acquiring request for the progress data of the operation progress is received, returns a data snapshot, so as to present a shopping picture 10 corresponding to the operation progress based on the data snapshot, so as to continue to go shopping according to previous shopping progress, and continue to learn of a previously interrupted commodity.

Figure 2B:
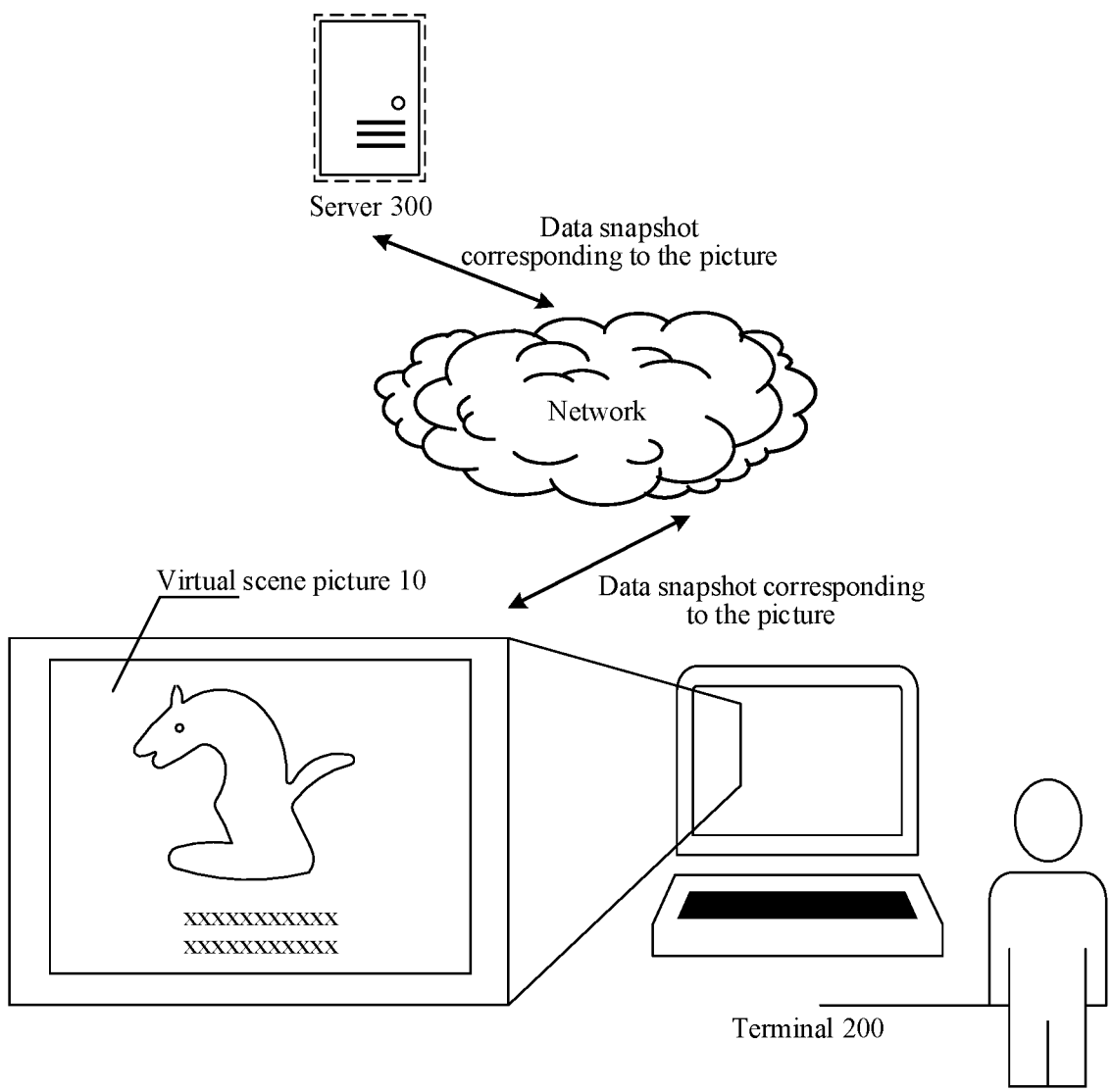

In another implementation scenario, FIG. 2B is a schematic diagram of an exemplary application mode of a data processing method for a virtual scene according to an embodiment of this application, and is applied to a terminal 200 and a server 300. Generally, the method is applicable to an application mode in which virtual scene computing is completed by relying on a computing capability of the server 300, and an application mode of the virtual scene is outputted by the terminal 200. The server 300 may be a server independently configured to support various services, or may be configured as a server cluster, or may be a cloud server.

Using forming visual perception of the virtual scene as an example, the server 300 computes display data related to the virtual scene and transmits the virtual scene to the terminal 200. The terminal 200 completes loading and parsing of the display data by using graphics computing hardware, and outputs the virtual scene by using graphics output hardware to form visual perception. For example, a two-dimensional picture or a video may be presented on a display screen of a smartphone, or a picture or a video that implements a three-dimensional display effect is projected on a lens of augmented reality/virtual reality glasses. For perception in the form of a virtual scene, it may be understood that corresponding hardware outputs of the terminal device may be used, for example, a microphone output is used for forming auditory perception, and a vibrator output is used for forming tactile perception.

As an example, the terminal 200 runs a game application, computes virtual scene-related display data by using the server 300 connected to a network, and transmits the virtual scene-related display data to the terminal 200. When the game application runs, that is, in a process in which a target user performs a virtual scene operation on the virtual scene, the terminal 200 receives a save instruction used for saving progress data corresponding to current operation progress of the virtual scene operation; and transmits a save request for the progress data to the server 300 in response to the save instruction. The server 300 generates, based on the save request, an archive file used for indicating the operation progress of the virtual scene operation, and generates and stores, based on the archive file, a data snapshot of the progress data corresponding to the operation progress. When receiving a picture display instruction for the operation progress, the terminal 200 transmits an acquiring request for the progress data corresponding to the picture to the server 300. The server 300 acquires, based on the acquiring request, a data snapshot of the progress data corresponding to the operation progress, and returns the data snapshot to the terminal 200. The terminal 200 presents, based on the data snapshot, a game picture 10 corresponding to the operation progress, so as to continue to play a game according to previous game progress, and continue a game task interrupted previously.

Figure 3:
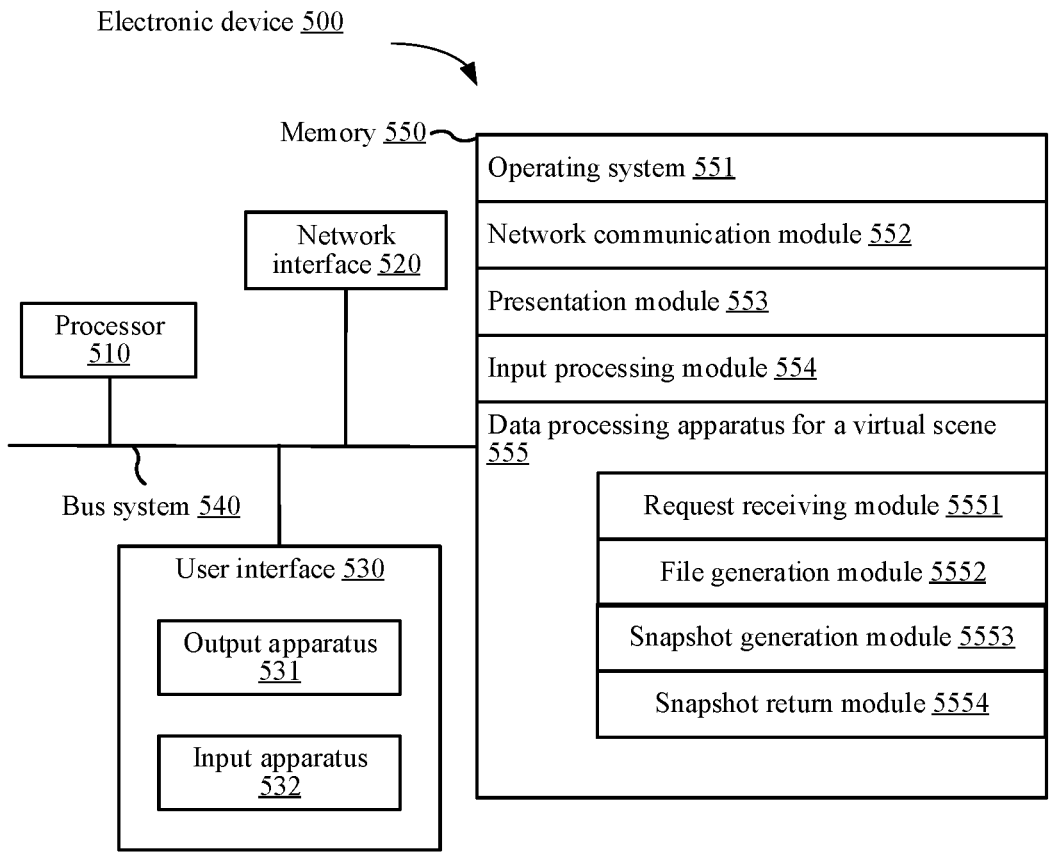
FIG. 3 is an exemplary schematic structural diagram of an electronic device according to an embodiment of this application.

FIG. 3 is an exemplary schematic structural diagram of an electronic device 500 according to an embodiment of this application. In actual application, the electronic device 500 may be the terminal 200 in FIG. 2A or FIG. 2B or the server 300 in FIG. 2B. That the electronic device is the terminal 200 shown in FIG. 2B is used as an example to describe the electronic device that implements the data processing method for a virtual scene in this embodiment of this application. The electronic device 500 shown in FIG. 3 includes at least one processor 510, a memory 550, at least one network interface 520, and a user interface 530. All the components in the electronic device 500 are coupled together by using a bus system 540. It may be understood that the bus system 540 is configured to implement connection and communication between these assemblies. In addition to a data bus, the bus system 540 further includes a power bus, a control bus, and a status signal bus. However, for ease of clear description, all types of buses are marked as the bus system 540 in FIG. 3.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 530 includes one or more output apparatuses 531 that can display media content, including one or more speakers and/or one or more visual display screens. The user interface 530 further includes one or more input apparatuses 532, including user interface components that facilitate inputting of a user, such as a keyboard, a mouse, a microphone, a touch display screen, a camera, and other input button and control.

The memory 550 may be a removable memory, a non-removable memory, or a combination thereof. An exemplary hardware device includes a solid-state memory, a hard disk drive, an optical disk drive, and the like. The memory 550 may include one or more storage devices that are physically away from the processor 510.

The memory 550 includes a volatile memory or a non-volatile memory, or may include a volatile memory and a non-volatile memory. The non-volatile memory may be a read-only memory (ROM). The volatile memory may be a random access memory (RAM). The memory 550 described in this embodiment of this application is to include any other suitable type of memories.

In some embodiments, the memory 550 can store data to support various operations, and examples of the data include programs, modules, and data structures, or subsets or supersets thereof, as illustrated below.

An operating system 551 includes a system program configured to process various basic system services and perform a hardware-related task, for example, a framework layer, a core library layer, and a driver layer, and is configured to implement various basic services and process a hardware-related task.

A network communication module 552 is configured to reach other computing devices through one or more (wired or wireless) network interfaces 520. Exemplary network interfaces 520 include: Bluetooth, Wireless Fidelity (WiFi), Universal Serial Bus (USB, Universal Serial Bus), and the like.

A presentation module 553 is configured to display information by using an output apparatus 531 (for example, a display screen or a speaker) associated with one or more user interfaces 530 (for example, a user interface configured to operate a peripheral device and display content and information).

An input processing module 554 is configured to detect one or more user inputs or interactions from one of the one or more input apparatuses 532 and translate the detected input or interaction.

In some embodiments, the data processing apparatus for a virtual scene provided in this embodiment of this application may be implemented in a software manner. FIG. 3 shows a data processing apparatus 555 for a virtual scene stored in a memory 550. The data processing apparatus 555 for a virtual scene may be software in a form of a program, a plug-in, or the like, and includes the following software modules: a request receiving module 5551, a file generation module 5552, a snapshot generation module 5553, and a snapshot returning module 5554. These modules are logically implemented. Therefore, any combination or further division may be performed according to an implemented function. A function of each module is described below.

In other embodiments, the data processing apparatus for a virtual scene provided in the embodiment of this application may be implemented in a hardware manner. As an example, the data processing apparatus for a virtual scene provided in the embodiment of this application may be a processor in a form of a hardware decoding processor, and is programmed to execute the data processing method for a virtual scene provided in the embodiment of this application. For example, a processor in a form of a hardware decoding processor may use one or more application specific integrated circuits (ASIC), a DSP, a programmable logic device (PLD), a complex programmable logic device (CPLD), a field-programmable gate array (FPGA), or another electronic component.

Figure 4A:
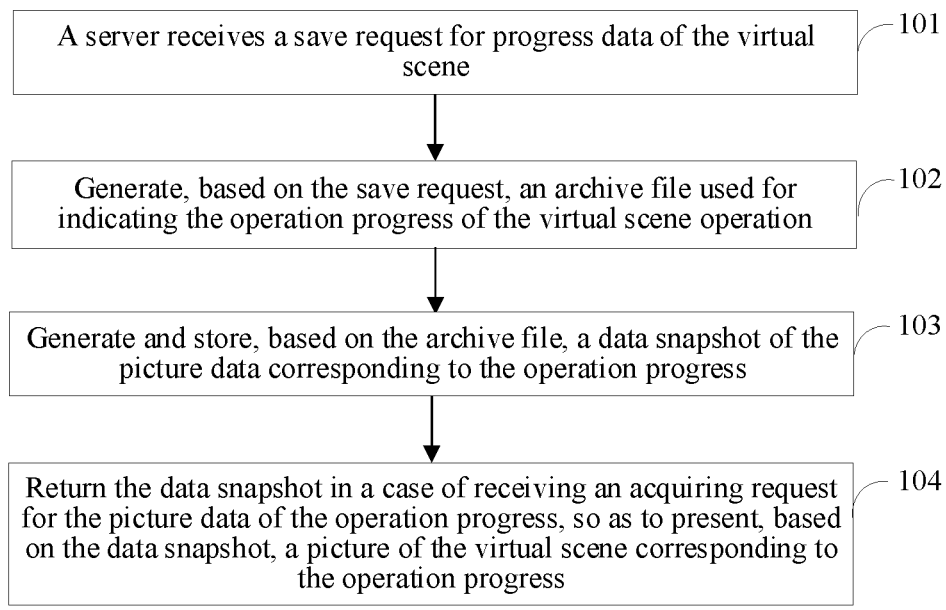
FIG. 4A is a schematic flowchart of a data processing method for a virtual scene according to an embodiment of this application.

The following describes the data processing method for a virtual scene provided in the embodiment of this application. In actual implementation, the data processing method for a virtual scene provided in the embodiment of this application may be separately implemented by a server or a terminal, or may be implemented by a server and a terminal in cooperation. FIG. 4A is a schematic flowchart of a data processing method for a virtual scene according to an embodiment of this application. An example in which a server separately implements the data processing method for a virtual scene according to the embodiment of this application is used for description.

Step 101: A server receives a save request for progress data of the virtual scene.

The save request is generated in a process in which a target user performs a virtual scene operation on the virtual scene, and is used for requesting to save progress data corresponding to current operation progress of the virtual scene operation.

Herein, in actual application, a client, such as a game client, a tourism application client, and a shopping application client, is disposed on the terminal. In a process in which the target user performs the virtual scene operation on the virtual scene by using the client on the terminal, the progress data corresponding to the operation progress corresponding to the currently performed virtual scene operation may be saved, so as to continue to perform a corresponding operation subsequently according to the saved progress data.

In some embodiments, in the process in which the target user performs the virtual scene operation on the virtual scene, the terminal may present a save function item corresponding to the virtual scene. When the target user triggers the save function item, the terminal receives, in response to a trigger operation, a save instruction used for saving the progress data corresponding to the operation progress of the virtual scene operation, and transmits a save request for the progress data to the server in response to the save instruction. In other embodiments, when the target user closes the currently presented picture, the terminal receives, in response to a picture close operation, a save instruction used for saving the progress data corresponding to the operation progress of the virtual scene operation, and transmits a save request for the progress data to the server in response to the save instruction.

Step 102: Generate, based on the save request, an archive file used for indicating the operation progress of the virtual scene operation.

Herein, the server saves, based on the save request, scenario data corresponding to the operation progress of the target game, to generate a corresponding document file.

Step 103: Generate and store, based on the archive file, a data snapshot of the progress data corresponding to the operation progress.

Herein, in actual implementation, before generating the corresponding data snapshot, the server may first determine whether a virtual function component that needs to be used for adjusting the operation progress corresponding to the virtual scene is required. When no virtual function component is required, the server may directly generate, according to the archive file, the data snapshot of the progress data corresponding to the operation progress. When a virtual function component is required, in addition to a document file, a corresponding data snapshot needs to be generated according to the corresponding virtual function component.

In some embodiments, the server may generate and store, based on the archive file, the data snapshot of the progress data corresponding to the operation progress in the following manner: acquiring a virtual function component used for adjusting the operation progress corresponding to the virtual scene; rendering, based on the archive file and the virtual function component, the picture of the virtual scene corresponding to the operation progress, to obtain a data snapshot that includes progress data of the picture corresponding to the operation progress; and storing the obtained data snapshot.

Herein, according to experience, most virtual scenes, for example, when a game, such as, especially, a game of a "mission" type, generates a data snapshot, a virtual function component that needs to be used for adjusting operation progress of the game is needed. After a picture of a virtual scene corresponding to the operation progress is rendered according to an archive file and the virtual function component, to obtain a data snapshot that includes progress data of a picture corresponding to the operation progress, the obtained data snapshot may be stored in a snapshot pool. When being stored, a data snapshot corresponding to each operation progress has a unique snapshot identifier.

The virtual function component includes image recognition, pre-loading, virtual tap/click, and the like. When the server acquires the archive file corresponding to the operation progress, the server first performs image recognition on the archive file, identifies corresponding image information, continues to pre-load all data and interference except the corresponding operation progress based on the identified image information, so as to skip another progress to enter the operation progress corresponding to the archive file, and render, by using virtual tap/click, the picture of the virtual scene corresponding to the operation progress, to obtain a data snapshot including the progress data corresponding to the operation progress.

For example, if the virtual scene is a game, operation progress of the current game may be identified by means of image recognition. For example, if it is identified that current operation progress of the game is mission 2, progress data of mission 1, other interference information, and the like need to be pre-loaded, so as to skip mission 1 to enter mission 2, and render, by using virtual tap/click, a picture corresponding to the second mission, to obtain a data snapshot that includes progress data of mission 2.

Step 104: Return the data snapshot in a case of receiving an acquiring request for the progress data of the operation progress, so as to present, based on the data snapshot, a picture of the virtual scene corresponding to the operation progress.

Herein, after saving the progress data corresponding to the operation progress corresponding to the virtual scene, if the user continues to perform the virtual scene operation at the next operation progress to be saved, the user may trigger a continue operation function item presented on the interface of the virtual scene, where the continue operation function item is used for implementing presentation of the picture of the virtual scene corresponding to the operation progress based on the operation progress of the virtual scene. In response to the trigger operation, the terminal receives a picture display instruction for the operation progress, and transmits an acquiring request for the progress data corresponding to the operation progress to the server in response to the picture display instruction to the server, and the server acquires and returns a corresponding data snapshot based on the snapshot identifier carried in the progress data request.

In some embodiments, before returning the data snapshot, the terminal may acquire the data snapshot in the following manner: determining, based on the acquiring request for the progress data, a snapshot identifier of the data snapshot of the progress data corresponding to the operation progress; and acquiring, based on the snapshot identifier, the data snapshot of the progress data corresponding to the operation progress from the stored data snapshot.

Herein, the acquiring request for the progress data carries the snapshot identifier of the data snapshot of the progress data corresponding to the operation progress. According to the snapshot identifier, a data snapshot that matches the snapshot identifier carried in the acquiring request for the progress data may be acquired from a stored data snapshot, for example, a snapshot pool, and is returned to the terminal. After receiving the data snapshot returned by the server, the terminal may present, based on the data snapshot, a picture of the virtual scene corresponding to the operation progress.

Figure 4B:
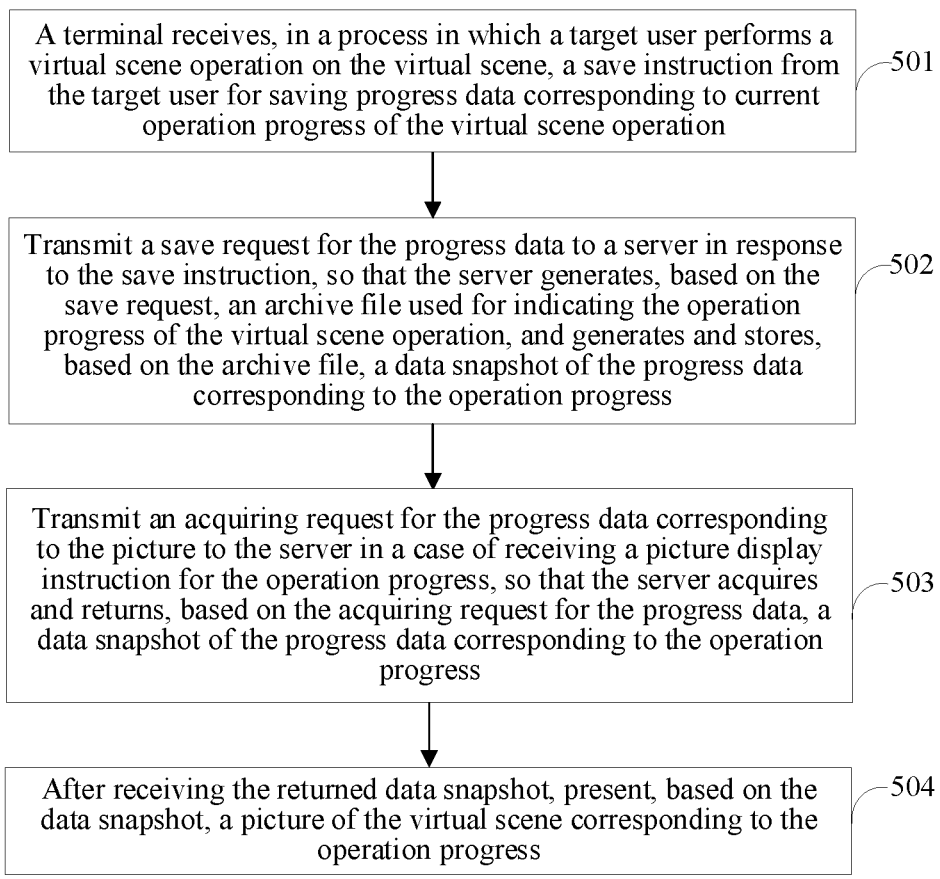
FIG. 4B is a schematic flowchart of a data processing method for a virtual scene according to an embodiment of this application.

FIG. 4B is a schematic flowchart of a data processing method for a virtual scene according to an embodiment of this application. An example in which a terminal separately implements the data processing method for a virtual scene according to the embodiment of this application is used for description with reference to the steps shown in FIG. 4B.

Step 501: The terminal receives, in a process in which a target user performs a virtual scene operation on the virtual scene, a save instruction used for saving progress data corresponding to current operation progress of the virtual scene operation.

In some embodiments, the terminal may receive the save instruction for the progress data of the virtual scene in the following manner:

presenting, in a view interface used for presenting the picture of the virtual scene, a save function item corresponding to the virtual scene; the save function item being used for saving the operation progress of the virtual scene corresponding to the current login account; and receiving, in response to a trigger operation for the save function item, a save instruction for the progress data of the virtual scene.

In actual implementation, in a process in which the target user performs the virtual scene operation on the virtual scene, when a player triggers the save function item, the terminal presents, in response to the trigger operation for the save function item, a saving interface used for saving operation progress of a virtual scene corresponding to a current login account; and stores, in response to a saving confirm instruction triggered by the saving interface, operation progress of the virtual scene corresponding to the current login account to the server. In this way, the target user may flexibly save the progress data corresponding to the current operation progress according to a requirement, thereby improving progress data storage efficiency.

Figure 6A:
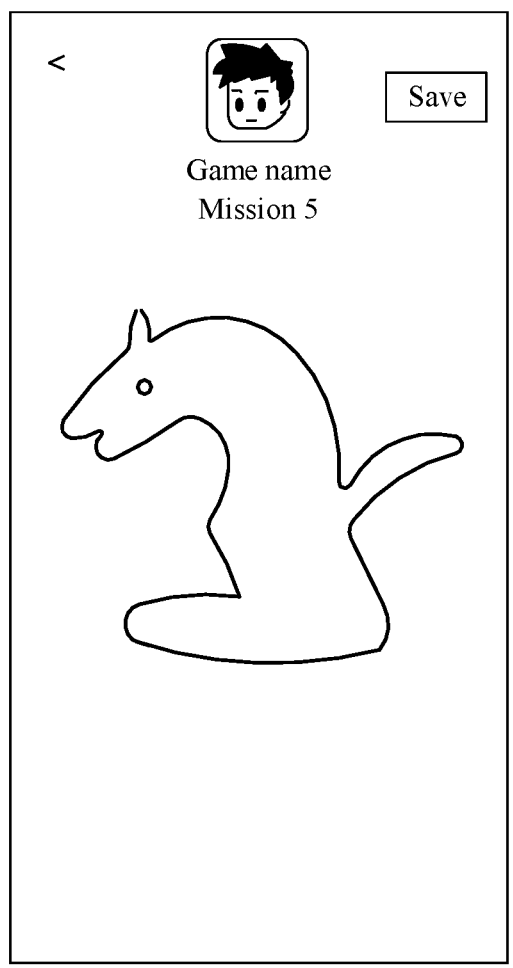
FIG. 6A to FIG. 6C are schematic diagrams of a progress saving interface according to an embodiment of this application.
Figure 6B:
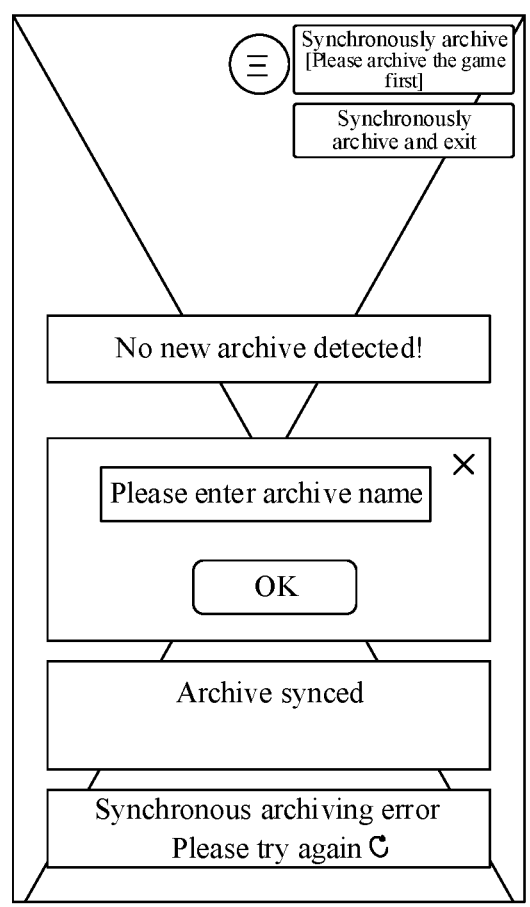

FIG. 6A and FIG. 6B are schematic diagrams of a progress saving interface according to an embodiment of this application. For example, a virtual scene is a game. In a view interface used for a game picture, a save function item corresponding to "save" of the game is presented. When a user triggers the save function item shown in FIG. 6A, a saving interface is presented in FIG. 6B. A saving confirm function item "Confirm" is presented in the saving interface. When the user triggers the saving confirm function item, a corresponding saving confirm instruction is triggered. In response to the saving confirm instruction, the terminal transmits operation progress of a virtual scene corresponding to a current login account to a server and stores the operation progress in the server.

In some embodiments, the terminal may receive a save instruction for the progress data of the virtual scene in the following manner: presenting, in response to a picture close operation instructing to close the presented picture, an information prompt window used for prompting whether to save the operation progress of the virtual scene; and receiving, by using an information prompt window, a save instruction for progress data of the virtual scene.

Herein, in a case in which the user does not select to save the corresponding operation progress in the operation process of the corresponding virtual scene, if the user closes the picture of the current corresponding virtual scene, corresponding prompt information is presented, so as to prompt the user to save the current operation progress, so that when the application of the virtual scene is opened again, the operation progress of the current operation continues to execute an operation task not executed in the virtual scene. That is, when the user closes the picture corresponding to the current operation progress, the terminal presents prompt information used for saving the operation progress of the virtual scene. The user may determine, based on the prompt information, whether to save the progress data corresponding to the operation progress. When determining to save, the user may trigger the corresponding save instruction by using a confirm option presented in the trigger information prompt window, for example, display archive reminder information and the corresponding save function item in the information prompt window, so that the user saves the current operation progress in a timely manner. In this way, when the target user disables the operation, progress data corresponding to a current operation progress may be saved, thereby improving progress data storage efficiency.

Figure 6C:
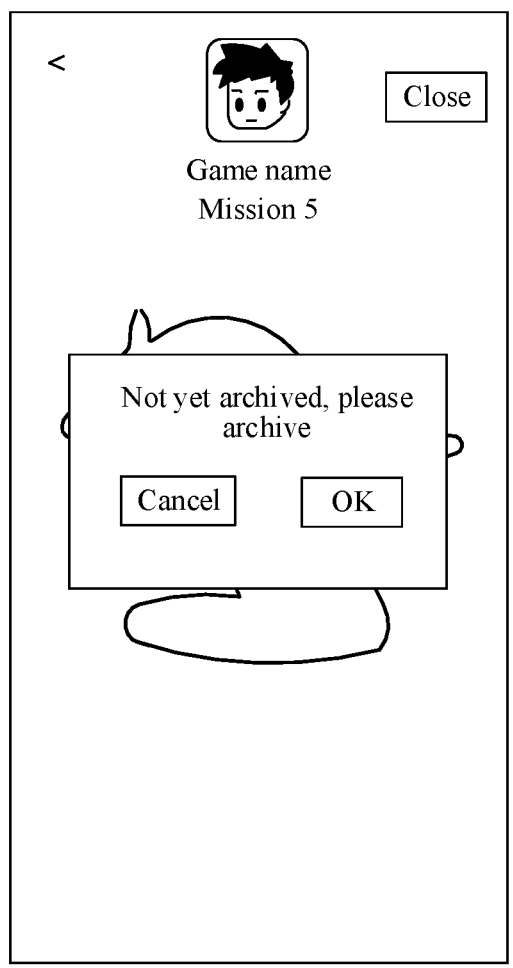

FIG. 6C is a schematic diagram of a progress saving interface according to an embodiment of this application. For example, a virtual scene is still a game. When the user closes a picture of a current corresponding virtual scene, an information prompt window is presented, and archive reminder information and a corresponding save function item are displayed in the information prompt window, so that the user saves current operation progress in a timely manner.

Step 502: Transmit a save request for the progress data to a server in response to the save instruction, so that the server generates, based on the save request, an archive file used for indicating the operation progress of the virtual scene operation, and generates and stores, based on the archive file, a data snapshot of the progress data corresponding to the operation progress.

Herein, the save request is generated in a process in which a target user performs a virtual scene operation on the virtual scene, and is used for requesting to save progress data corresponding to current operation progress of the virtual scene operation. When receiving the save request, the server saves, based on the save request, scene data corresponding to current operation progress of a target game, to generate a corresponding document file, and determines whether a virtual function component that needs to be used for adjusting the operation progress corresponding to the virtual scene is required, for example, a combination of tools for producing picture content corresponding to the operation progress, such as virtual tap/click, pre-loading, and image recognition.

When no virtual function component is required, the server may directly generate a data snapshot of progress data corresponding to the operation progress according to the archive file; when a virtual function component is required, in addition to a document file, further acquires a virtual function component that is used for adjusting the operation progress corresponding to the virtual scene; renders, based on the archive file and the virtual function component, the picture of the virtual scene corresponding to the operation progress, to obtain a data snapshot that includes progress data of the picture corresponding to the operation progress; and stores the obtained data snapshot.

In actual application, according to experience, most virtual scenes, for example, when a game, such as, especially, a game of a "mission" type, generates a data snapshot, a virtual function component that needs to be used for adjusting operation progress of the game is needed. After a picture of a virtual scene corresponding to the operation progress is rendered according to an archive file and the virtual function component, to obtain a data snapshot that includes progress data of a picture corresponding to the operation progress, the obtained data snapshot may be stored in a snapshot pool. When being stored, a data snapshot corresponding to each operation progress has a unique snapshot identifier.

In some embodiments, before transmitting the acquiring request for the progress data corresponding to the picture to the server, the terminal may receive the picture display instruction corresponding to the operation progress in the following manner.

The terminal presents a continue operation function item for the virtual scene: and receives a picture display instruction for the operation progress in response to a trigger operation for the continue operation function item.

The continue operation function item is used for implementing the operation progress of the virtual scene corresponding to the target user, and present a picture of the virtual scene corresponding to the operation progress.

In actual application, when the user enables the client to execute the application of the virtual scene, the user may select to start a new application or execute the application according to previous operation progress. When selecting to execute the application according to the previous operation progress, the user triggers a corresponding continue function item to trigger a picture display instruction of corresponding operation progress.

In some embodiments, the terminal may present the continue operation function item of the corresponding virtual scene in the following manner: running an application corresponding to the virtual scene to present an initial page corresponding to the virtual scene; and presenting, on the initial page corresponding to the virtual scene, the continue operation function item corresponding to the virtual scene.

Figure 5A:
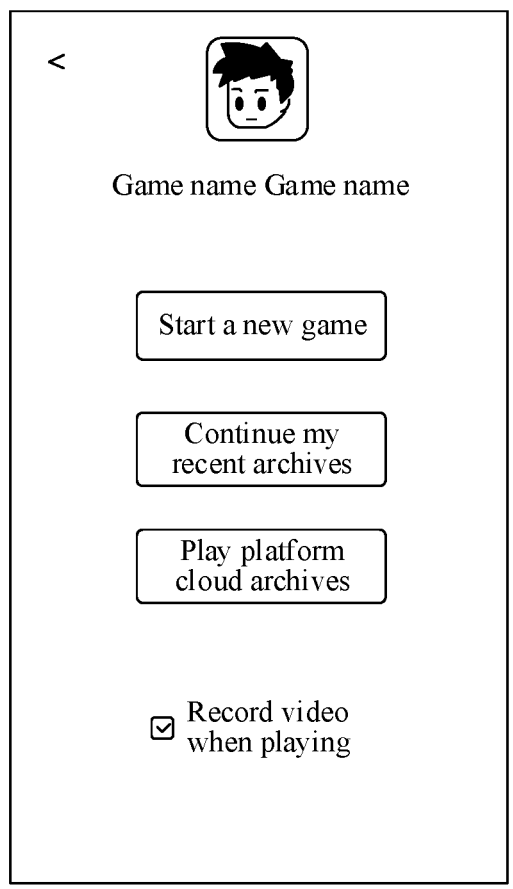
FIG. 5A to FIG. 5D are schematic diagrams of a selection interface according to an embodiment of this application.

Herein, the initial interface may be a page that is presented after the user successfully logs in based on the login page. For example, the virtual scene is a game. After the user logs in successfully based on the login page, an initial page shown in FIG. 5A is presented. FIG. 5A is a schematic diagram of an interface according to an embodiment of this application. In FIG. 5A, a continue operation function item of "continue my latest archive" is presented on the initial page.

In some embodiments, the terminal may further present the continue operation function item of the corresponding virtual scene in the following manner: presenting a first continue selection function item of the corresponding virtual scene; and presenting, in response to a trigger operation for the first continue selection function item, a continue selection interface used for selecting operation progress of a virtual scene corresponding to a current login account; and presenting, in the continue selection interface, the continue operation function item corresponding to the operation progress of the current login account.

Herein, the continue operation function item is used for implementing the operation progress based on the virtual scene corresponding to the current login account, and present a picture of the virtual scene corresponding to the operation progress.

Figure 5B:
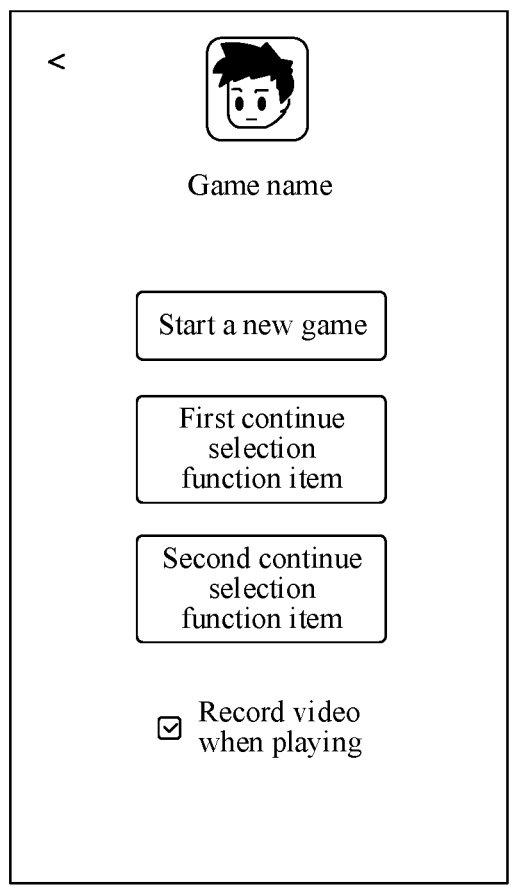
Figure 5C:
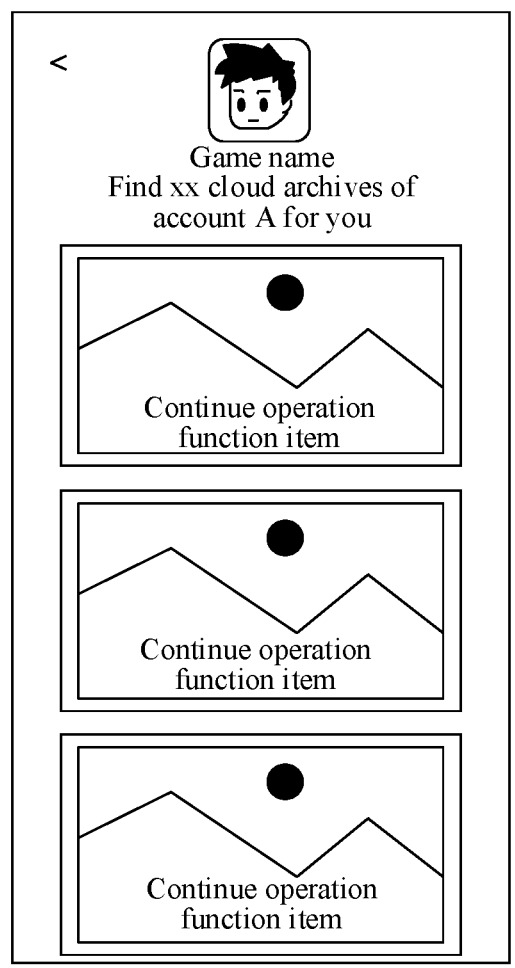

FIG. 5B to FIG. 5C are schematic diagrams of a selection interface according to an embodiment of this application. When a user corresponding to a current login account A opens a virtual scene application on a client, a first continue selection function item shown in FIG. 5B is presented. When the user triggers the first continue selection function item, a continue selection interface shown in FIG. 5C is presented, and at least one continue operation function item corresponding to the account A is presented in a continue selection interface. Herein, the continue function item is used for implementing operation progress of a virtual scene corresponding to the account A, and present a picture of a virtual scene corresponding to the operation progress.

In some embodiments, the terminal may present the continue operation function item of the corresponding virtual scene in the following manner: presenting a second continue selection function item of the corresponding virtual scene; and presenting, in response to a trigger operation for the second continue selection function item, a second continue selection interface used for selecting operation progress of a virtual scene corresponding to a current login account; and presenting, in the second continue selection interface, the continue operation function item corresponding to the operation progress of the target login account. The target login account is different from the current login account.

Herein, the continue operation function item is used for implementing operation progress based on a virtual scene corresponding to the target account different from the current login account, and present a picture of the virtual scene corresponding to the operation progress.

Figure 5D:
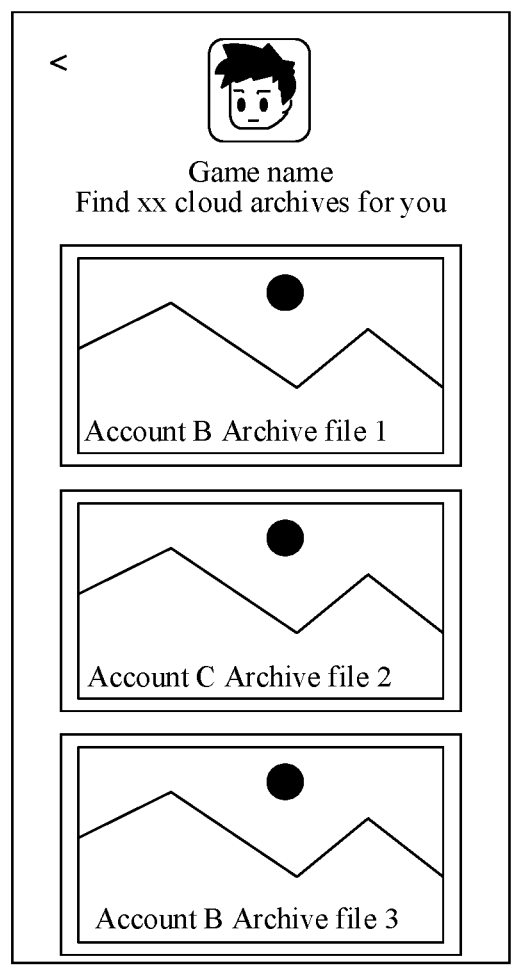

For example, when the user corresponding to the current login account A opens a virtual scene application on a client, a second continue selection function item shown in FIG. 5B is presented. When the user triggers the second continue selection function item, a continue selection interface shown in FIG. 5D is presented. FIG. 5D is a schematic diagram of a selection interface provided in this embodiment of this application, and a plurality of continue operation function items are presented in a continue selection interface, for example, an archive file 1 corresponding to an account B, an archive file 2 corresponding to an account C, and an archive file 3 corresponding to the account B. Herein, the continue function item is used for implementing operation progress of a virtual scene corresponding to the account B or the account C, and present the picture of the virtual scene corresponding to the operation progress.

In some embodiments, when the continue operation function item corresponding to the operation progress of the target login account different from the current login account is presented in the second continue selection interface of the terminal, the terminal may further acquire, in the following manner, the operation progress of the virtual scene corresponding to the target user before acquiring the data snapshot corresponding to the picture from the server:

presenting an operation progress selection interface when there are at least two target login accounts; presenting, in the operation progress selection interface, a progress selection item corresponding to the operation progress of the target login account; the target login account being in a one-to-one correspondence with the progress selection item; and determining, in response to a progress selection instruction triggered by the progress selection item, that operation progress corresponding to a corresponding progress selection item is operation progress of a virtual scene corresponding to the target user.

For example, in FIG. 5D, the archive file 1 corresponding to the account B, the archive file 2 corresponding to the account C, and the archive file 3 corresponding to the account B, and the archive file 1, the archive file 2, and the archive file 3 are corresponding to different operation progress. For example, for a mission game, the archive file 1 may be corresponding to mission 2, and the archive file 2 may be corresponding to mission 4, and the archive file 3 may be corresponding to mission 5, and when the user triggers the archive file 1, a progress operation instruction for the archive file 1 is triggered, and mission 2 corresponding to the selected archive file 1 is determined as the operation progress corresponding to the target user.

In some embodiments, the terminal may further present a progress level corresponding to each progress selection item and a progress level corresponding to the current login account; receive a selection operation for the progress selection item; trigger, in response to the selection operation, the progress selection instruction when a difference between a progress level corresponding to the selected progress selection item and the progress level corresponding to the current login account is less than a threshold; and present, when the difference reaches the threshold, prompt information used for instructing to perform operation progress reselection.

For example, for a mission game, a total quantity of missions is 20, a progress level corresponding to a current login account A is mission 5, a progress level corresponding to an account B presented in an operation progress selection interface is mission 6, a progress level corresponding to an account C is mission 7, a progress level corresponding to an account D is mission 10, and a progress level corresponding to an account E is mission 15. If a threshold is set to 3, only when a target user corresponding to the account A triggers a progress item corresponding to the account B or the account C, a progress instruction can be triggered, and operation progress corresponding to the selected account B or account C is used as operation progress corresponding to the target user, that is, the target user may play mission 6 or 7 of the game. When the target user selects a progress item higher than mission 7, prompt information is displayed for reselection. That is, the target user does not have the right to play the game content at the progress level above mission 7.

Step 503: Transmit an acquiring request for the progress data corresponding to the picture to the server in a case of receiving a picture display instruction for the operation progress, so that the server acquires and returns, based on the acquiring request for the progress data, a data snapshot of the progress data corresponding to the operation progress.

Herein, when the terminal receives the picture display instruction for the operation progress, the terminal transmits, in response to the picture display instruction, an acquiring request for the progress data corresponding to the picture to the server, so as to acquire a data snapshot corresponding to the picture from the server. In actual implementation, the server may determine, based on the acquiring request for the progress data, a snapshot identifier of the data snapshot of the progress data corresponding to the operation progress; and acquire, based on the snapshot identifier, the data snapshot of the progress data corresponding to the operation progress from the stored data snapshot. Herein, the acquiring request for the progress data carries the snapshot identifier of the data snapshot of the progress data corresponding to the operation progress. According to the snapshot identifier, a data snapshot that matches the snapshot identifier carried in the acquiring request for the progress data may be acquired from a stored data snapshot, for example, a snapshot pool, and is returned to the terminal.

Step 504: After receiving the returned data snapshot, present, based on the data snapshot, a picture of the virtual scene corresponding to the operation progress.

Herein, after receiving the data snapshot returned by the server, the terminal presents, based on the data snapshot, the picture of the virtual scene corresponding to the operation progress of the target login account. In this way, the server returns the generated data snapshot to the terminal, and the terminal may present, based on the data snapshot, the virtual scene picture corresponding to the operation progress, so that the user can resume the previously interrupted virtual scene task according to the latest operation progress.

In some embodiments, after presenting the picture of the virtual scene corresponding to the operation progress, the terminal may further share the operation progress of the virtual scene corresponding to the current login account in the following manner: presenting a shared function item corresponding to the operation progress of the virtual scene; and sharing the operation progress of the virtual scene corresponding to the current login account in response to a trigger operation for the shared function item, so that another account different from the current login account is capable of presenting a picture of the virtual scene based on the operation progress of the virtual scene corresponding to the current login account.

Figure 7:
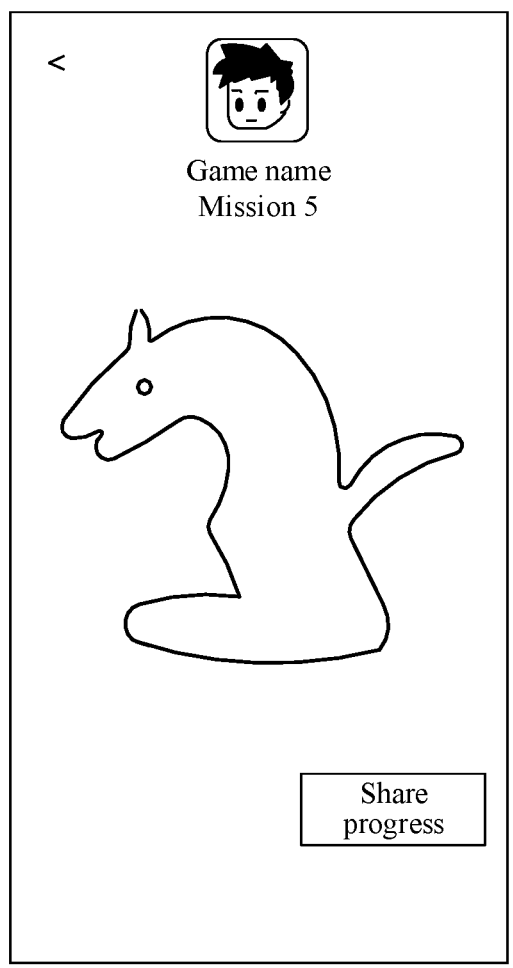
FIG. 7 is a schematic diagram of a progress sharing interface according to an embodiment of this application.

FIG. 7 is a schematic diagram of a progress sharing interface according to an embodiment of this application. In FIG. 7, a shared function item corresponding to current operation progress of a virtual scene is presented. When the user triggers the function item, the operation progress of the user may be shared, so that another user presents, based on the shared operation progress, a picture of a virtual scene corresponding to the operation progress.

Figure 8:
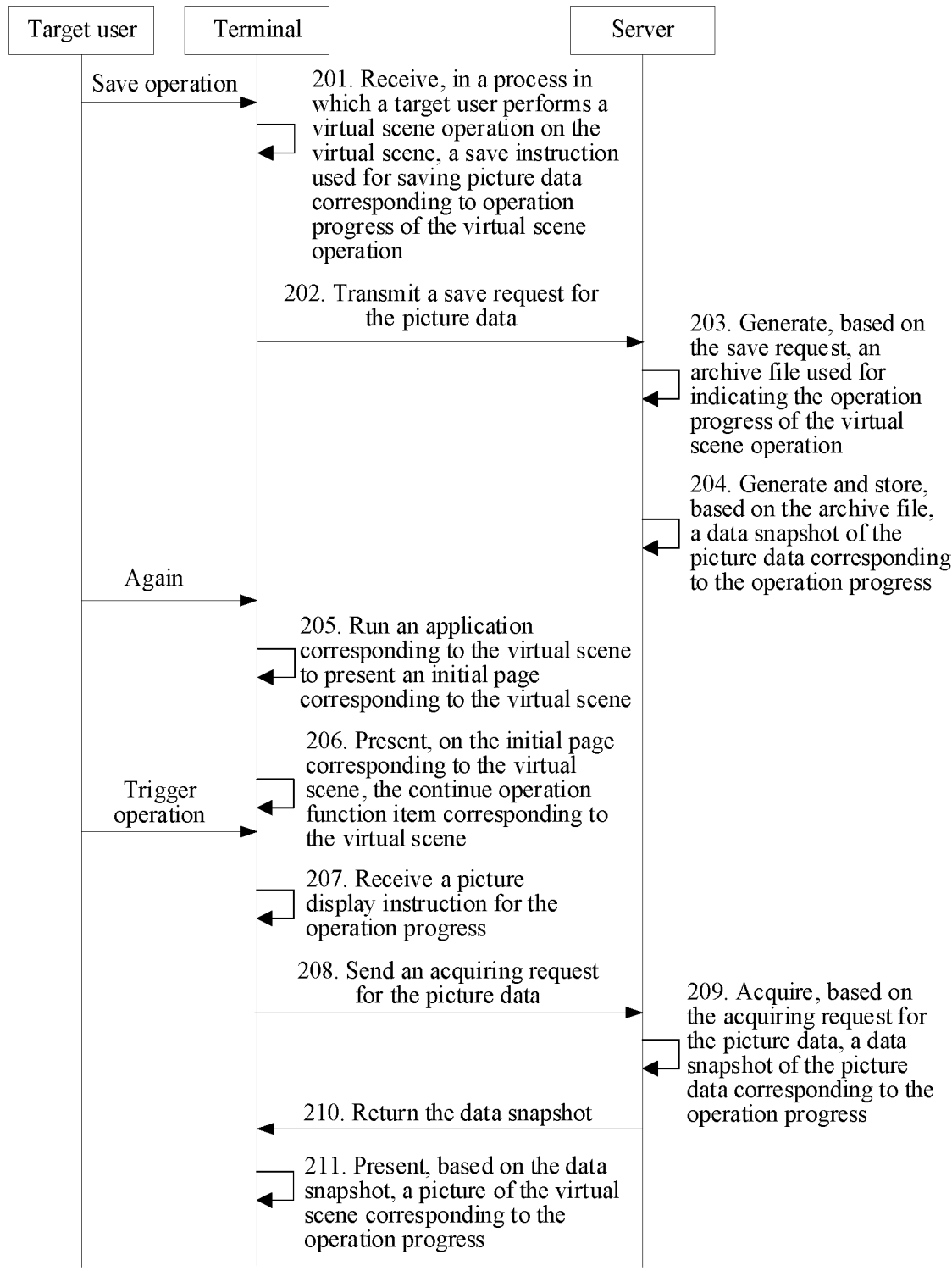
FIG. 8 is an exemplary schematic flowchart of a data processing method for a virtual scene according to an embodiment of this application.

The data processing method for a virtual scene provided in an embodiment of this application is further described. FIG. 8 is a schematic flowchart of a data processing method for a virtual scene according to an embodiment of this application. The method is described by using an example in which a terminal and a server perform coordinated implementation of the method.

Step 201: The terminal receives, in a process in which a target user performs a virtual scene operation on the virtual scene, a save instruction used for saving progress data corresponding to current operation progress of the virtual scene operation.

Step 202: Transmit a save request for the progress data to the server in response to the save instruction.

The save request is generated in a process in which a target user performs a virtual scene operation on the virtual scene, and is used for requesting to save progress data corresponding to current operation progress of the virtual scene operation.

Step 203: The server generates, based on the save request, an archive file used for indicating the operation progress of the virtual scene operation.

Step 204: Generate and store, based on the archive file, a data snapshot of the progress data corresponding to the operation progress.

By performing step 201 to step 204, the progress data corresponding to the operation progress expected by the user to be stored is stored in a form of a data snapshot, where the data snapshot has a unique snapshot identifier and corresponds to the corresponding operation progress.

Step 205: The terminal runs an application corresponding to the virtual scene to present an initial page corresponding to the virtual scene.

Herein, the initial interface may be a page that is presented after the user successfully logs in based on the login page.

Step 206: The terminal presents, on the initial page corresponding to the virtual scene, the continue operation function item corresponding to the virtual scene.

The continue operation function item is used for implementing the operation progress of the virtual scene corresponding to the target user, and present a picture of the virtual scene corresponding to the operation progress.

Step 207: The terminal receives a picture display instruction for the operation progress in response to a trigger operation for the continue operation function item.

Step 208: The terminal transmits, in response to the picture display instruction, an acquiring request for the progress data of the picture corresponding to the operation progress to the server.

The acquiring request for the progress data is used for requesting to acquire the progress data of the picture corresponding to the operation progress.

Step 209: The server acquires, based on the acquiring request for the progress data, a data snapshot of the progress data corresponding to the operation progress.

Step 210: The server returns the data snapshot to the terminal.

Step 211: The terminal presents, based on the data snapshot, a picture of the virtual scene corresponding to the operation progress.

By performing steps 205-211, the target user may continue to perform a corresponding operation according to previous operation progress.

Figure 9C:
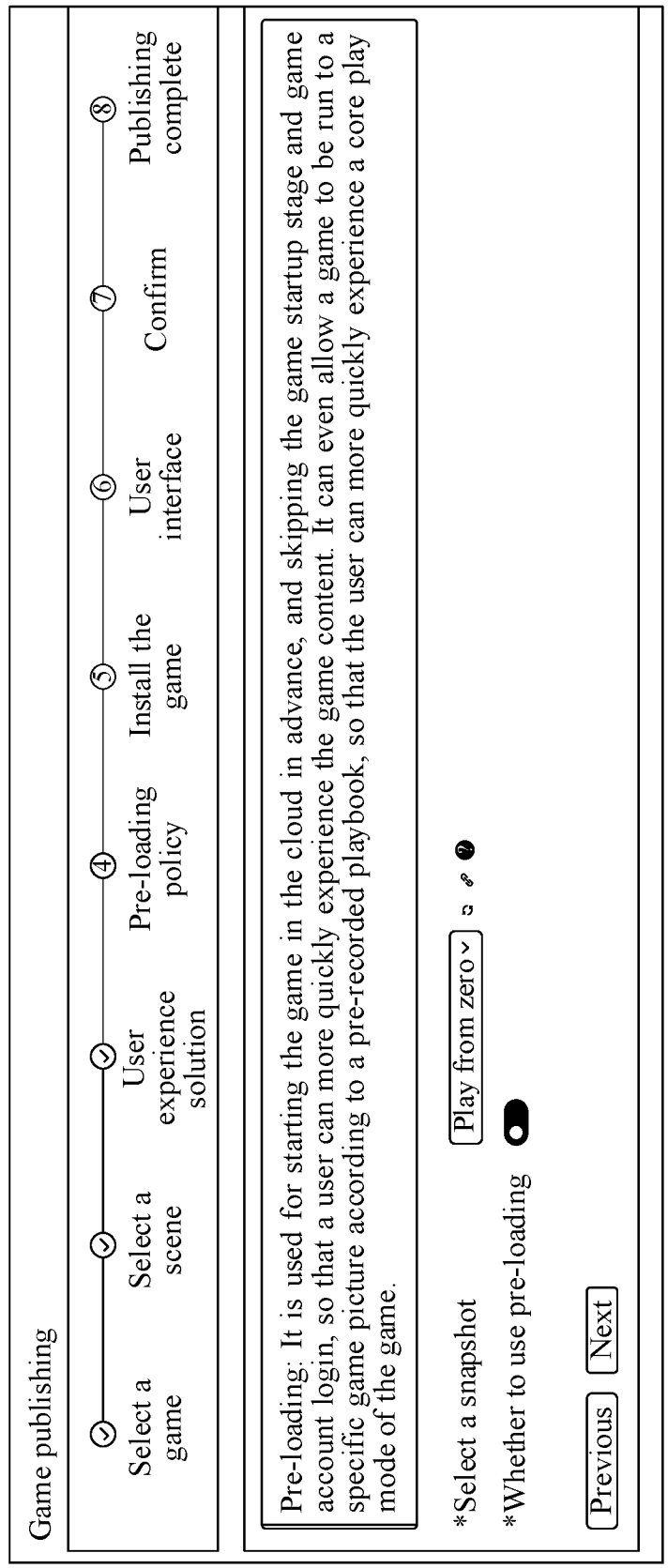

The following describes an exemplary application of this embodiment of this application in an actual application scenario. In a cloud game, a user can save game progress in a process of playing the cloud game on a terminal, generate an archive file, and store the archive file in an OSS library. A background manager can manage the archive file in the OSS library to facilitate use by an operator and the user. FIG. 9A to FIG. 9C are schematic diagrams of a management interface according to an embodiment of this application. In FIG. 9A, an archive file is managed, for example, an archive name, a game to which an archive file belongs, whether an archive file is uploaded, and an archive description are checked, and an incorrect or improper description is edited, so that the archive file is relatively standardized. In FIG. 9B, a data snapshot is mainly managed. For example, a data snapshot is formed by performing series configuration on an archive file, and specific operations such as adding, managing, and displaying the data snapshot may be performed. In FIG. 9C, after generating the data snapshot, the server publishes the generated data snapshot, that is, pushes the data snapshot to the terminal, so that the terminal presents a game picture corresponding to game progress based on the data snapshot, so that the user can continue to play the game.

Figure 10A:
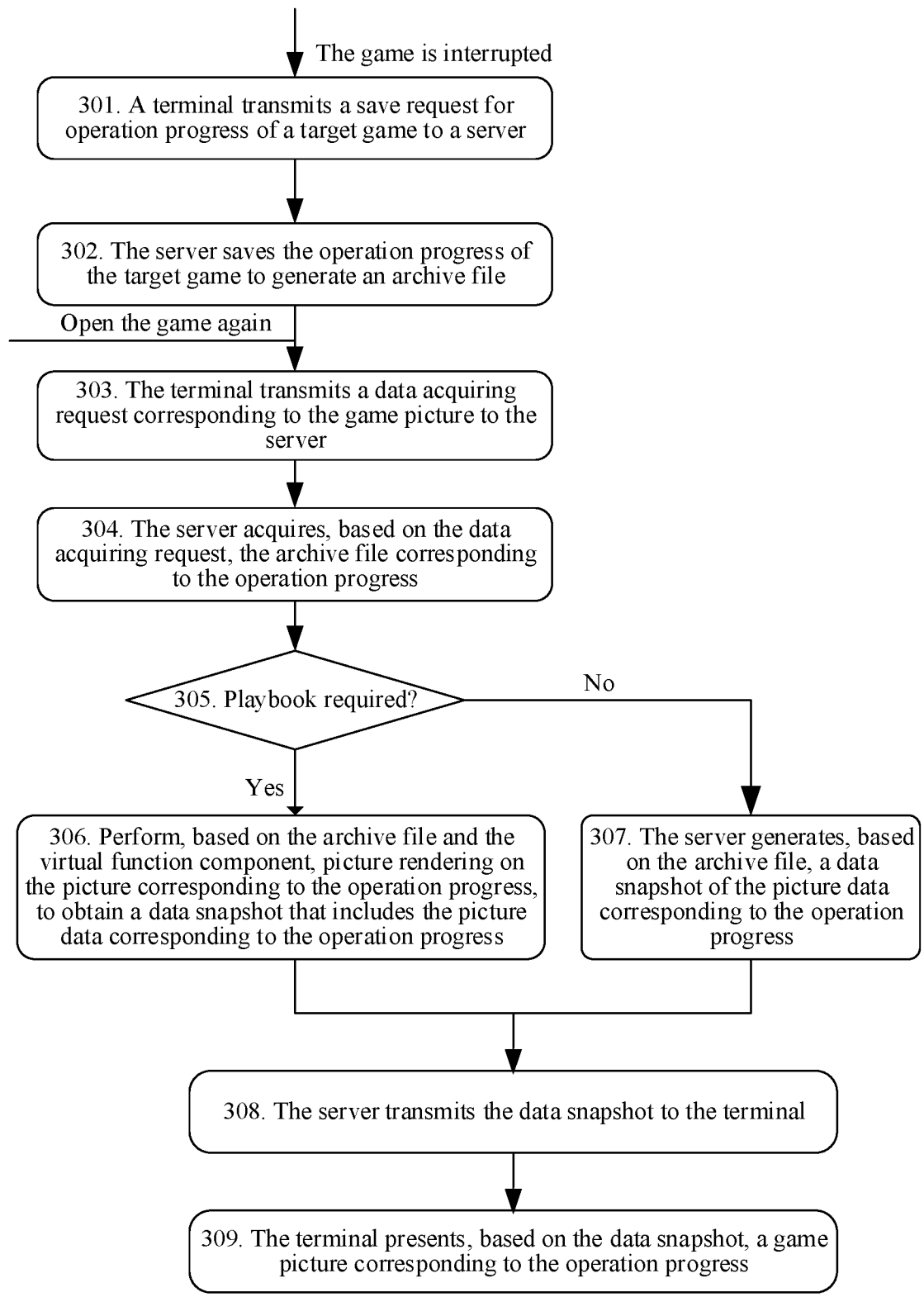
FIG. 10A and FIG. 10B are exemplary schematic flowcharts of a data processing method for a virtual scene according to an embodiment of this application.

FIG. 10A is a schematic flowchart of a data processing method for a virtual scene according to an embodiment of this application, which is described with reference to FIG. 10A.

Step 301: A terminal transmits a save request for operation progress of a target game to a server.

Herein, the target game is a game played by a user. In actual application, in a process in which the user plays the target game, a save function item (that is, an archive button) corresponding to current operation progress of the target game is presented on a view interface of a game picture. When the user ends playing the target game and closes the game picture, the terminal presents, in response to a close operation on the game picture, an information prompt window used for prompting whether to save the operation progress of the target game, and presents, in the information prompt window, a save function item of the operation progress of the corresponding target game. Herein, the save function item is used for saving the operation progress of the target game corresponding to the current login account.

When the user triggers the save function item, the terminal generates and transmits a save request corresponding to the current operation progress to the server in response to the trigger operation, so as to save the operation progress of the current target game to the server.

Step 302: The server saves the operation progress of the target game to generate an archive file.

In actual application, the server may also save, in a process of the user game, the operation progress of the user for the target game in real time.

Step 303: In response to a trigger operation of the user, the terminal transmits a data acquiring request corresponding to the game picture to the server.

Herein, after the user opens the target game on the terminal again, the terminal presents an initial page corresponding to the target game shown in FIG. 5A based on successful login of the login page, and presents a continue function item such as "continue my latest archive" in the initial page. The continue operation function item is used for implementing operation progress based on the target game corresponding to the target user, and present the game picture corresponding to the operation progress. When the user triggers the continue function item "continue my latest archive", the terminal generates and transmits a data acquiring request used for acquiring the game picture corresponding to the operation progress to the server, so as to request progress data corresponding to the operation progress of the target game.

Step 304: The server acquires, based on the data acquiring request, the archive file corresponding to the operation progress.

Herein, based on the data acquiring request, the server fetches the latest archive file according to a size, time, and the like of the archive file, and determines the latest archive file as the archive file corresponding to the operation progress.

Step 305: The server determines whether a virtual function component used for adjusting the operation progress of the target game is required.

Herein, according to experience, for most games, especially a game of a "mission" type, when a data snapshot is generated, a virtual function component (that is, a playbook capability needs to be used) that is used for adjusting the operation progress of the target game is required. When it is determined that the data snapshot corresponding to the target game is generated, and the playbook capability needs to be used, step 306 is performed. Otherwise, step 307 is performed.

Step 306: The server performs, based on the archive file and the virtual function component, picture rendering on the picture corresponding to the operation progress, to obtain a data snapshot that includes the progress data corresponding to the operation progress.

Step 307: The server generates, based on the archive file, a data snapshot of the progress data corresponding to the operation progress.

Step 308: The server transmits the data snapshot to the terminal.

Herein, the server publishes the generated data snapshot, that is, pushes the data snapshot to the terminal.

Step 309: The terminal presents, based on the data snapshot, a game picture corresponding to the operation progress.

In this way, according to the latest operation progress, the user can continue to play the game according to a game task interrupted previously.

Figure 10B:
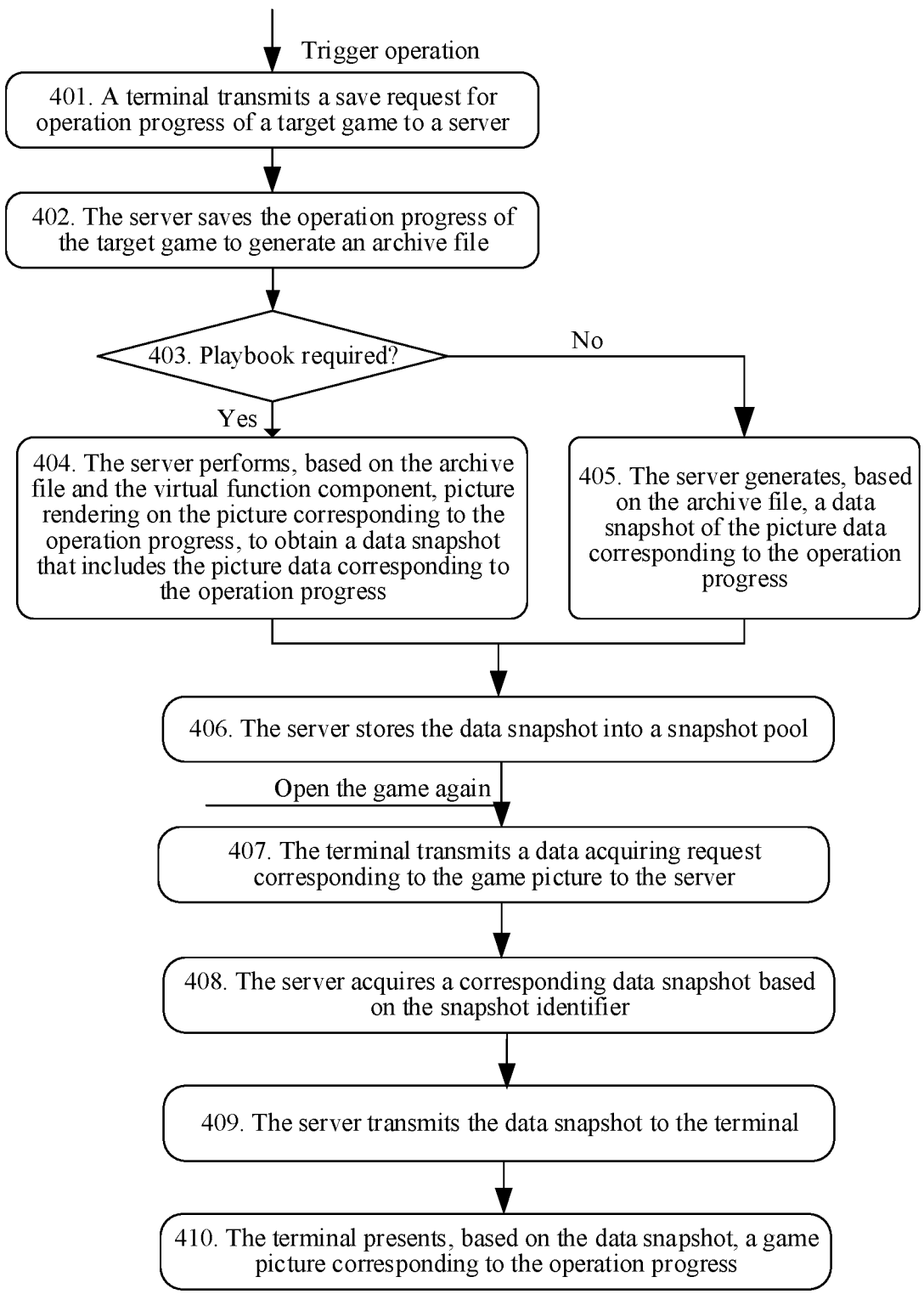

FIG. 10B is a schematic flowchart of a data processing method for a virtual scene according to an embodiment of this application, which is described with reference to FIG. 10B.

Step 401: A terminal transmits a save request for operation progress of a target game to a server.

Herein, when a user plays the target game or ends playing the target game and closes a game picture, operation progress of the target game corresponding to a current login account may be saved by triggering a save function item. When the user triggers the save function item, the terminal generates and transmits a save request corresponding to the current operation progress to the server in response to the trigger operation, so as to save the operation progress of the current target game to the server.

Step 402: The server saves the operation progress of the target game based on the save request to generate an archive file.

Step 403: The server determines whether a virtual function component used for adjusting the operation progress of the target game is required.

Herein, according to experience, for most games, especially a game of a "mission" type, when a data snapshot is generated, a virtual function component (that is, a playbook capability needs to be used) that is used for adjusting the operation progress of the target game is required. When it is determined that the data snapshot corresponding to the target game is generated, and the playbook capability needs to be used, step 404 is performed. Otherwise, step 405 is performed.

Step 404: The server performs, based on the archive file and the virtual function component, picture rendering on the picture corresponding to the operation progress, to obtain a data snapshot that includes the progress data corresponding to the operation progress.

Step 405: The server generates, based on the archive file, a data snapshot of the progress data corresponding to the operation progress.

Step 406: The server stores the data snapshot into a snapshot pool.

Herein, the generated data snapshot is stored in the snapshot pool in the server, and a data snapshot corresponding to each operation progress has a unique snapshot identifier.

Step 407: In response to a trigger operation of the user, the terminal transmits a data acquiring request corresponding to the game picture to the server.

Herein, after the user opens the target game on the terminal again, the terminal presents an initial page corresponding to the target game shown in FIG. 5A based on successful login of the login page, and presents a continue function item such as "continue my latest archive" in the initial page. The continue operation function item is used for implementing operation progress based on the target game corresponding to the target user, and present the game picture corresponding to the operation progress. When the user triggers the continue function item "continue my latest archive", the terminal generates and transmits a data acquiring request used for acquiring the game picture corresponding to the operation progress to the server, so as to request progress data corresponding to the operation progress of the target game.

Step 408: The server acquires a corresponding data snapshot based on the snapshot identifier.

Step 409: The server transmits the data snapshot to the terminal.

Step 410: The terminal presents, based on the data snapshot, a game picture corresponding to the operation progress.

In this way, the data snapshot corresponding to the operation progress of the target game is stored in the server. When the data snapshot corresponding to the operation progress needs to be acquired, the corresponding data snapshot is directly obtained from the server based on the snapshot identifier and returned to the terminal, and the user can continue, according to the latest operation progress, the game task interrupted previously, thereby implementing game continuation.

Figure 11:
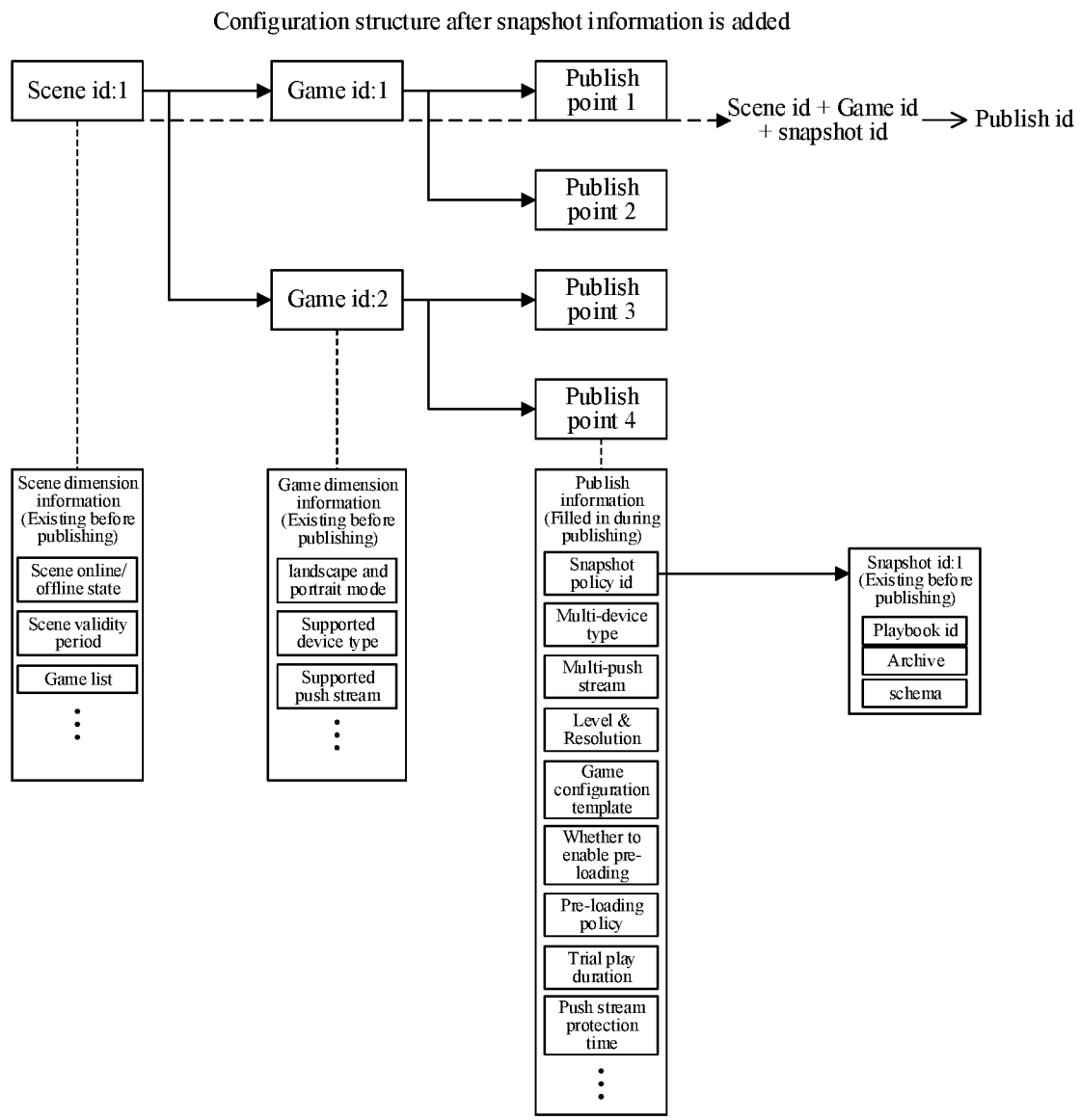
FIG. 11 is a schematic logical diagram of a newly added snapshot dimension according to an embodiment of this application.

FIG. 11 is a schematic logical diagram of a newly added snapshot dimension according to an embodiment of this application. As shown in FIG. 11, an identity document (id) is a scene corresponding to a game, for example, in a scene of Honor of Kings, a game id is used for indicating a game version. Generally, different game versions are corresponding to different game identifiers. For example, a game id:1 is corresponding to an overseas version of Honor of Kings, and a game id:2 is corresponding to a domestic version of Honor of Kings. A publish point may be determined based on publish conditions such as a game configuration template, trial play time, and a level & resolution. For example, a game id:1 has two publish points, that is, a publish point 1 and a publish point 2.

Scene dimension information mainly refers to a scene online/offline state, a scene limit period, a game list, and the like, for example, an online/offline state of a game and a limited period of a game. Game dimension information refers to a type of a device supported by a game, a push stream form, and a screen status. Publish information mainly refers to a snapshot policy, multi-device type, multi-push stream form, level & resolution, game configuration template, whether to enable pre-loading, pre-loading policy, trial play duration, and push stream protection time.

In actual implementation, the server extracts configuration items such as a pre-loaded playbook, an archive, and a document structure (schema), and abstracts them as "snapshots", to form a structure of "scene-game-snapshot publish point". Each publish point may select a snapshot identifier, and some of the original configuration items also need to sink into a snapshot dimension, for example, an allocation policy, a pre-loading policy, a level and resolution configuration, a device allocation, a current quantity of push streams, a pre-loaded quantity, a pre-loaded quantity prediction, and a pull-configured game picture. When the client on the terminal starts the game, the parameter id is added. The compatible snapshot concept needs to be displayed when the scenario game list is displayed and the configured game picture is pulled through the server interface.

Figure 12:
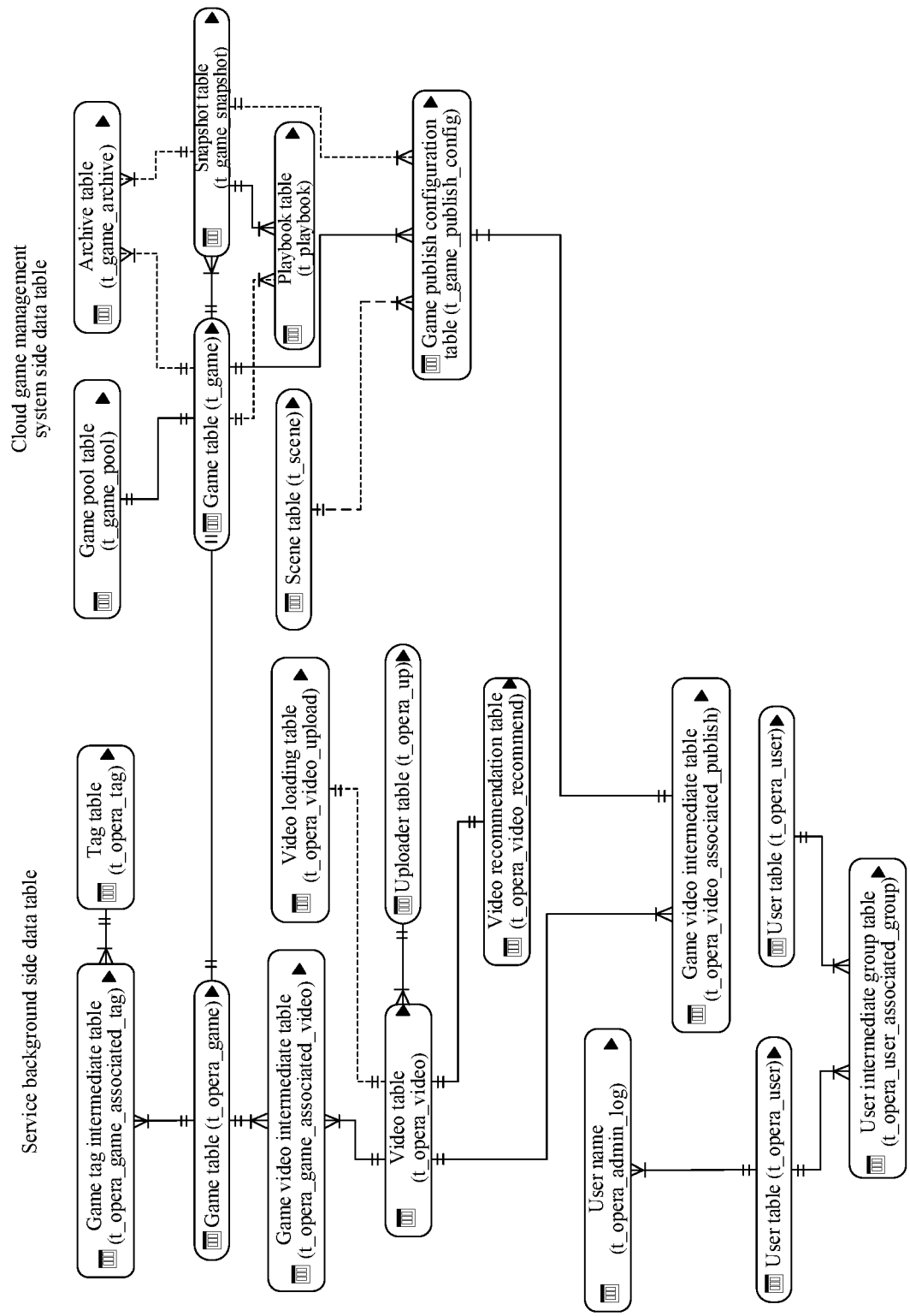
FIG. 12 is a schematic design diagram of a data table according to an embodiment of this application.

FIG. 12 is a schematic design diagram of a data table according to an embodiment of this application. FIG. 12 relates to a service background side data table and a cloud game management system (OSS) side data table.

In the OSS side data table, a ratio relationship between the game pool table (t_game_pool) and the game table (t_game) is n:1, a ratio relationship between the archive table (t_game_archive) and the game table (t_game) is n:1, a ratio relationship between the archive table (t_game_archive) and the snapshot table (t_game_snapshot) is n:1, a ratio relationship between the playbook table (t_playbook) and the game table (t_game) is n:1, a ratio relationship between the playbook table (t_playbook) and the snapshot table (t_game_snapshot) is n:1, a ratio relationship between the snapshot table (t_game_snapshot) and the game table (t_game) is n:1, a ratio relationship between the snapshot table (t_game_snapshot) and the game publish configuration table (t_game_publish_config) is 1:n, a ratio relationship between the game publish configuration table (t_game_publish_config) and the game table (t_game) is n:1, a ratio relationship between the game publish configuration table (t_game_publish_config) and the scene table (t_scene) is t_scene, and a ratio relationship between the game publish configuration table (t_game_publish_config) and the snapshot table (t_game_snapshot) is n:1.

In the service background side data table, a ratio relationship between a game table (t_opera_game) and a tag table (t_opera_tag) is n:n, a ratio relationship between an uploader table (t_opera_up) and a video table (t_opera_video) is 1:n, a ratio relationship between a video table (t_opera_video) and a game table (t_opera_game) is n:n, a ratio relationship between a video recommendation table (t_opera_video_recommend) and a video table (t_opera_video) is 1:1, and a ratio relationship between a game video intermediate table (t_opera_video_associated_publish) and a video table (t_opera_video) is n:1. n is a positive number not less than 2.

A game publish configuration table (t_game_publish_config) includes a snapshot id. A snapshot policy may be found according to the snapshot id. The snapshot policy may be an ordered combination list (archive/playbook). The snapshot policy is stored in a policy field of the t_game_point table in an array json string format [{id, type}, {id, type}], where a value of type being 1 indicates a playbook, and a value of 2 represents an archive file.

In the foregoing manner, an archive file is generated by performing archiving in a cloud manner, and a data snapshot is generated by assembling a single archive file, a single playbook capability, or an archive file and a playbook, so that a user saves the archive file in a process of playing a cloud game or when exiting, so as to continue playing next time.

According to the data processing method for a virtual scene provided in the embodiment of this application, at least the following beneficial effects are achieved:

(1) The archive file does not occupy the local storage space of the user. The archive file exists on the server. As long as the user logs in with the same account, the archive file of the game can be retrieved from any device to continue the game, even if the user's previous device is lost, damaged, or replaced with a new device.

(2) Support of archive file test: Currently, the last obstacle is that the archive file cannot be tested by itself. The archive file test is supported here, and is published after it is tested.

(3) Solving the conflict problem of archive files: When the game is archived, the same account may be archived on a plurality of devices at the same time. If the device is archived late due to a network problem, a data conflict may occur. Herein, the archive files are compared, and the latest archive file is selected as the final archive file.

(4) The storage space is large and does not occupy the local storage space of the user, because the archive itself is on the server, the storage space is large and the user can use it freely.

(5) The cloud game can be continued without the need for developer access, which reduces the cost of the game developer and does not require the content creator to use a dedicated (root) mobile phone for archiving. That is, even if a content creator does not have the super user right of the terminal mobile phone operating system, the archive file can be generated in a game playing process, which reduces the cost of the content creator.

Figure 13:
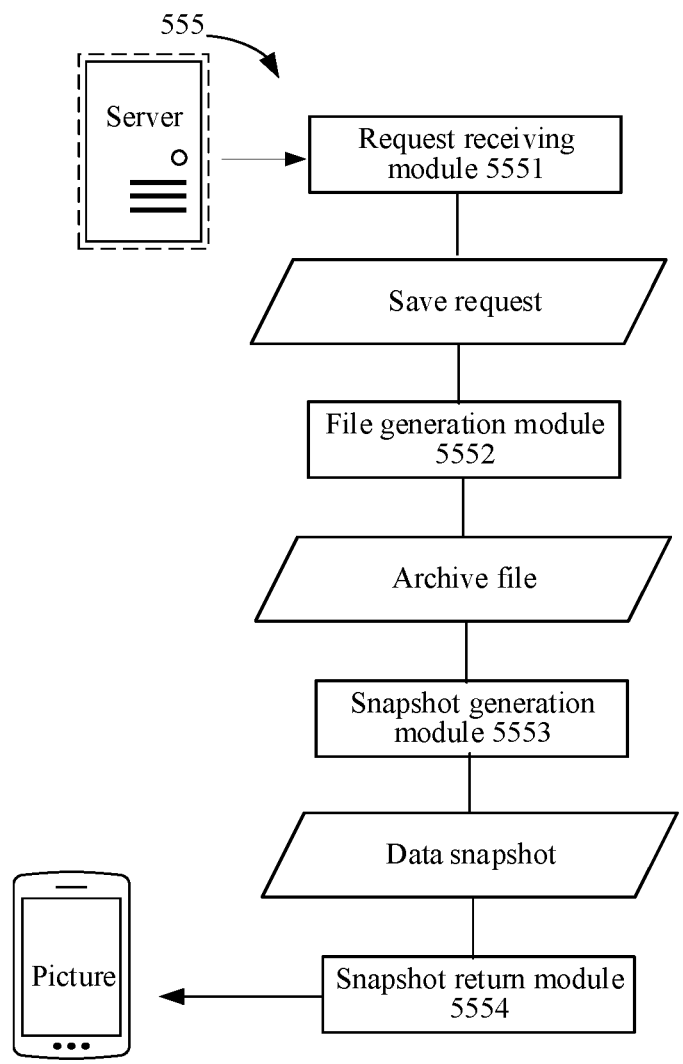
FIG. 13 is a schematic structural diagram of a data processing apparatus for a virtual scene according to an embodiment of this application.

The following continues to describe an example structure in which a data processing apparatus 555 for a virtual scene provided in the embodiments of this application is implemented as a software module. In some embodiments, FIG. 13 is a schematic structural diagram of a data processing apparatus for a virtual scene according to an embodiment of this application. Software modules of the data processing apparatus 555 for a virtual scene that are stored in a memory 540 may include:

a request receiving module 5551, configured to receive a save request for progress data of the virtual scene;

the save request being generated in a process in which a target user performs a virtual scene operation on the virtual scene, and being used for requesting to save progress data corresponding to current operation progress of the virtual scene operation;

a file generation module 5552, configured to generate, based on the save request, an archive file used for indicating the operation progress of the virtual scene operation;

a snapshot generation module 5553, configured to generate and store, based on the archive file, a data snapshot of the progress data corresponding to the operation progress; and a snapshot returning module 5554, configured to: return the data snapshot in a case of receiving an acquiring request for the progress data of the operation progress, so as to present, based on the data snapshot, a picture of the virtual scene corresponding to the operation progress.

In some embodiments, the snapshot generation module 5553 is further configured to acquire a virtual function component used for adjusting the operation progress corresponding to the virtual scene;

render, based on the archive file and the virtual function component, the picture of the virtual scene corresponding to the operation progress, to obtain a data snapshot that includes progress data of the picture; and store the obtained data snapshot.

In some embodiments, before the returning the data snapshot, the apparatus further includes:

a snapshot acquiring module, configured to determine, based on the acquiring request for the progress data, a snapshot identifier of the data snapshot for the progress data corresponding to the operation progress; and acquire, based on the snapshot identifier, the data snapshot of the progress data corresponding to the operation progress from the stored data snapshot.

Figure 14:
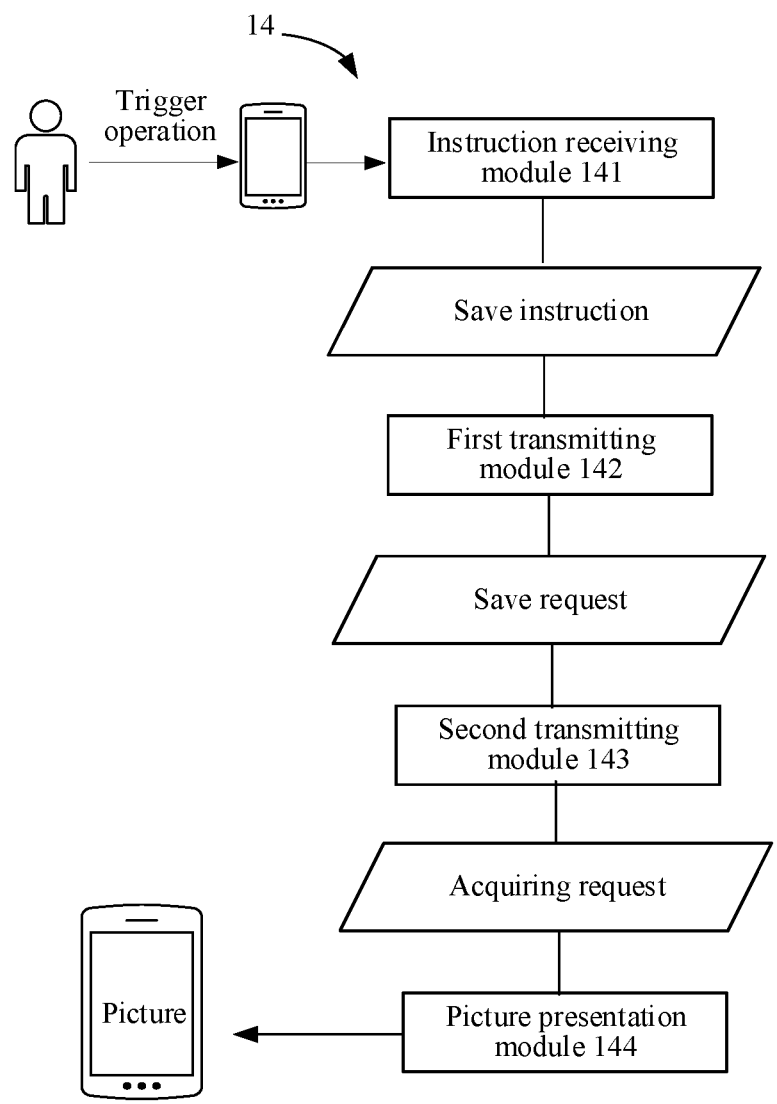
FIG. 14 is a schematic structural diagram of a data processing apparatus for a virtual scene according to an embodiment of this application.

FIG. 14 is a schematic structural diagram of a data processing apparatus 14 for a virtual scene according to an embodiment of this application. This embodiment of this application provides the data processing apparatus 14 for a virtual scene, including:

an instruction receiving module 141, configured to: receive, in a process in which a target user performs a virtual scene operation on the virtual scene, a save instruction used for saving progress data corresponding to current operation progress of the virtual scene operation;

a first transmitting module 142, configured to: transmit a save request for the progress data to a server in response to the save instruction, so that the server generates, based on the save request, an archive file used for indicating the operation progress of the virtual scene operation, and generates and stores, based on the archive file, a data snapshot of the progress data corresponding to the operation progress;

a second transmitting module 143, configured to: transmit an acquiring request for the progress data corresponding to the picture to the server in a case of receiving a picture display instruction for the operation progress, so that the server acquires and returns, based on the acquiring request, a data snapshot of the progress data corresponding to the operation progress; and a picture presentation module 144, configured to: receive the returned data snapshot, and present, based on the data snapshot, a picture of the virtual scene corresponding to the operation progress.

In some embodiments, before the transmitting an acquiring request for the progress data corresponding to the picture to the server, the apparatus further includes:

a first presentation module, configured to present a continue operation function item for the virtual scene, the continue operation function item being used for presenting a picture of the virtual scene corresponding to the operation progress based on the operation progress of the virtual scene; and receive a picture display instruction for the operation progress in response to a trigger operation for the continue operation function item.

In some embodiments, the first presentation module is further configured to run an application corresponding to the virtual scene to present an initial page corresponding to the virtual scene; and present, on the initial page corresponding to the virtual scene, the continue operation function item corresponding to the virtual scene.

In some embodiments, the first presentation module is further configured to present a first continue selection function item corresponding to the virtual scene;

present, in response to a trigger operation for the first continue selection function item, a continue selection interface used for selecting operation progress of a virtual scene corresponding to a current login account; and present, in the continue selection interface, the continue operation function item corresponding to the operation progress of the current login account.

In some embodiments, the first presentation module is further configured to present a second continue selection function item corresponding to the virtual scene;

present, in response to a trigger operation for the second continue selection function item, a second continue selection interface used for selecting operation progress of a virtual scene corresponding to a current login account; and present, in the second continue selection interface, the continue operation function item corresponding to current operation progress of a target login account.

The target login account is different from the current login account.

In some embodiments, before the transmitting an acquiring request for the progress data corresponding to the picture to a server, the apparatus further includes a second presentation module configured to: before the data snapshot corresponding to the picture is acquired from the server, present an operation progress selection interface when there are at least two target login accounts;

present, in the operation progress selection interface, a progress selection item corresponding to the operation progress of the target login account; the target login account being in a one-to-one correspondence with the progress selection item; and determine, in response to a progress selection instruction triggered by the progress selection item, that operation progress corresponding to a corresponding progress selection item is operation progress of a virtual scene corresponding to the target user.

In some embodiments, the second presentation module is further configured to present a progress level corresponding to each progress selection item and a progress level corresponding to the current login account;

receive a selection operation for the progress selection item;

trigger, in response to the selection operation, the progress selection instruction when a difference between a progress level corresponding to the selected progress selection item and the progress level corresponding to the current login account is less than a threshold; and present, when the difference reaches the threshold, prompt information used for instructing to perform operation progress reselection.

In some embodiments, the second presentation module is further configured to present, based on the data snapshot, a picture of a virtual scene corresponding to the operation progress of the target login account.

In some embodiments, the instruction receiving module is further configured to present, in a view interface used for presenting the picture of the virtual scene, a save function item corresponding to the virtual scene;

the save function item being used for saving the operation progress of the virtual scene corresponding to the current login account; and receive, in response to a trigger operation for the save function item, a save instruction used for saving the progress data corresponding to the operation progress of the virtual scene operation.

In some embodiments, the instruction receiving module is further configured to present, in response to a picture close operation instructing to close the presented picture, an information prompt window used for prompting whether to save the operation progress of the virtual scene; and receive, by using the information prompt window, a save instruction used for saving the progress data corresponding to the operation progress of the virtual scene operation.

In some embodiments, the apparatus further includes a fifth presentation module, and the sharing module is configured to: after the picture of the virtual scene corresponding to the operation progress is presented,
  present a shared function item corresponding to the operation progress of the virtual scene; and
  share the operation progress of the virtual scene corresponding to the current login account in response to a trigger operation for the shared function item, so that another account different from the current login account is capable of presenting a picture of the virtual scene based on the operation progress of the virtual scene corresponding to the current login account.

In some embodiments, the first transmitting module is further configured to transmit a save request for the progress data to the server, so that the server generates, based on the save request, an archive file used for indicating the operation progress of the virtual scene operation, and acquires a virtual function component used for adjusting the operation progress corresponding to the virtual scene, so as to render, based on the archive file and the virtual function component, a picture of the virtual scene corresponding to the operation progress, to obtain a data snapshot that includes progress data of the picture.

An embodiment of this application provides an electronic device, including:
  a memory, configured to store executable instructions; and
  a processor, configured to: when executing the executable instructions stored in the memory, implement the data processing method for a virtual scene provided in the embodiment of this application.

An embodiment of this application provides a computer program product or a computer program. The computer program product or the computer program includes computer instructions, and the computer instructions are stored in a computer-readable storage medium. A processor of a computer device reads the computer instructions from the computer readable storage medium, and the processor executes the computer instructions, so that the computer device performs the data processing method for a virtual scene provided in the embodiment of this application.

An embodiment of this application provides a computer readable storage medium that stores executable instructions. When the executable instructions are executed by a processor, the processor performs the data processing method for a virtual scene provided in the embodiment of this application.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in a plurality of collaborative files (for example, be stored in files of one or more modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of the present disclosure, but are not intended to limit the protection scope of the present disclosure. Any modification, equivalent replacement, or improvement made without departing from the spirit and range of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for processing data associated with a virtual scene of a gaming application performed by an electronic device, the method comprising:
  receiving, in a process in which a target user of the electronic device performs a virtual scene operation on the virtual scene of the gaming application, a save instruction from the target user for saving progress data corresponding to current operation progress of the virtual scene operation;
  transmitting a save request for the progress data to a server in response to the save instruction, wherein the server generates, based on the save request, an archive file used for indicating the operation progress of the virtual scene operation associated with the save instruction from the target user, and generates and stores, based on the archive file, a data snapshot of the progress data corresponding to the operation progress associated with the save instruction from the target user and a first progress level of the target user in the game application;
  transmitting an acquiring request for the progress data corresponding to the operation progress associated with the save instruction from the target user to the server in response to a picture display instruction for the operation progress from a second user of the electronic device that is different from the target user, wherein the server acquires and returns, based on the acquiring request for the progress data, the data snapshot of the progress data corresponding to the operation progress associated with the save instruction from the target user to the electronic device;
  presenting, based on the data snapshot, a picture of the virtual scene corresponding to the operation progress associated with the save instruction from the target user; and
  in response to a selection of a continue operation function item presented on the picture of the virtual scene by the second user of the electronic device, determining a difference between a second progress level of the second user in the game application and the first progress level of the target user in the game application, wherein the first and second progress levels are numeric values;

comparing the difference between the second progress level of the second user and the first progress level of the target user and a predefined threshold; and when a difference between the second progress level of the second user and the first progress level of the target user is less than the predefined threshold, resuming the virtual scene operation based on the operation progress associated with the save instruction from the target user by submitting a new data request to the server, wherein the server sends, based on the new data request, the archive file to the electronic device for resuming the virtual scene operation based on the operation progress for the second user.

2. The method according to claim 1, wherein the method further comprises:

before transmitting the acquiring request for the progress data corresponding to the picture to the server:

presenting a continue operation function item for the virtual scene, the continue operation function item being used for presenting a picture of the virtual scene corresponding to the operation progress based on the operation progress of the virtual scene; and receiving the picture display instruction for the operation progress in response to a trigger operation for the continue operation function item by the target user of the electronic device.

3. The method according to claim 2, wherein the presenting a continue operation function item for the virtual scene comprises:

running an application corresponding to the virtual scene to present an initial page corresponding to the virtual scene; and presenting, on the initial page corresponding to the virtual scene, the continue operation function item corresponding to the virtual scene.

4. The method according to claim 2, wherein the presenting a continue operation function item for the virtual scene comprises:

presenting a first continue selection function item corresponding to the virtual scene;

presenting, in response to a trigger operation for the first continue selection function item, a continue selection interface used for selecting operation progress of a virtual scene corresponding to a current login account of the target user of the electronic device; and presenting, in the continue selection interface, the continue operation function item corresponding to the operation progress of the current login account.

5. The method according to claim 2, wherein the presenting a continue operation function item for the virtual scene comprises:

presenting a second continue selection function item corresponding to the virtual scene;

presenting, in response to a trigger operation for the second continue selection function item, a second continue selection interface used for selecting operation progress of a virtual scene corresponding to a current login account of another user different from the target user; and presenting, in the second continue selection interface, the continue operation function item corresponding to current operation progress of a target login account, the target login account being different from a current login account.

6. The method according to claim 1, wherein the receiving a save instruction used for saving progress data corresponding to current operation progress of the virtual scene operation comprises:

presenting, in a view interface used for presenting the picture of the virtual scene, a save function item corresponding to the virtual scene, the save function item being used for saving the operation progress of the virtual scene corresponding to a current login account of the target user; and receiving, in response to a trigger operation for the save function item, a save instruction used for saving the progress data corresponding to the operation progress of the virtual scene operation.

7. The method according to claim 1, wherein the receiving a save instruction used for saving progress data corresponding to current operation progress of the virtual scene operation comprises:

presenting, in response to a picture close operation instructing to close the presented picture, an information prompt window used for prompting whether to save the operation progress of the virtual scene; and receiving, by using the information prompt window, a save instruction used for saving the progress data corresponding to the operation progress of the virtual scene operation.

8. The method according to claim 1, wherein the method further comprises:

presenting a shared function item corresponding to the operation progress of the virtual scene; and sharing the operation progress of the virtual scene corresponding to a current login account in response to a trigger operation for the shared function item with an account different from the current login account, so that the account different from the current login account is capable of presenting a picture of the virtual scene based on the operation progress of the virtual scene corresponding to the current login account.

9. The method according to claim 1, wherein the transmitting a save request for the progress data to a server comprises:

transmitting a save request for the progress data to the server, wherein the save request is generated while the target user performs a virtual scene operation on the virtual scene, and wherein the server generates, based on the save request, an archive file used for indicating the operation progress of the virtual scene operation, acquires a virtual function component used for adjusting the operation progress corresponding to the virtual scene, and renders, based on the archive file and the virtual function component, a picture of the virtual scene corresponding to the operation progress, to obtain the data snapshot that comprises progress data of the picture.

10. An electronic device, comprising:

a memory, configured to store executable instructions; and a processor, configured to, when executing the executable instructions stored in the memory, implement a method for processing data associated with a virtual scene of a gaming application, the method including:

receiving, in a process in which a target user of the electronic device performs a virtual scene operation on the virtual scene of the gaming application, a save instruction from the target user for saving progress data corresponding to current operation progress of the virtual scene operation;

transmitting a save request for the progress data to a server in response to the save instruction, wherein the server generates, based on the save request, an archive file used for indicating the operation progress of the virtual scene operation associated with the save instruction from the target user, and generates and stores, based on the archive file, a data snapshot of the progress data corresponding to the operation progress associated with the save instruction from the target user and a first progress level of the target user in the game application;

transmitting an acquiring request for the progress data corresponding to the operation progress associated with the save instruction from the target user to the server in response to a picture display instruction for the operation progress from a second user of the electronic device that is different from the target user, wherein the server acquires and returns, based on the acquiring request for the progress data, the data snapshot of the progress data corresponding to the operation progress associated with the save instruction from the target user to the electronic device;

presenting, based on the data snapshot, a picture of the virtual scene corresponding to the operation progress associated with the save instruction from the target user; and in response to a selection of a continue operation function item presented on the picture of the virtual scene by the second user of the electronic device, determining a difference between a second progress level of the second user in the game application and the first progress level of the target user in the game application, wherein the first and second progress levels are numeric values;

comparing the difference between the second progress level of the second user and the first progress level of the target user and a predefined threshold; and when a difference between the second progress level of the second user and the first progress level of the target user is less than the predefined threshold, resuming the virtual scene operation based on the operation progress associated with the save instruction from the target user by submitting a new data request to the server, wherein the server sends, based on the new data request, the archive file to the electronic device for resuming the virtual scene operation based on the operation progress for the second user.

11. The electronic device according to claim 10, wherein the method further comprises:
before transmitting the acquiring request for the progress data corresponding to the picture to the server:
presenting a continue operation function item for the virtual scene, the continue operation function item being used for presenting a picture of the virtual scene corresponding to the operation progress based on the operation progress of the virtual scene; and
receiving the picture display instruction for the operation progress in response to a trigger operation for the continue operation function item by the target user of the electronic device.

12. The electronic device according to claim 11, wherein the presenting a continue operation function item for the virtual scene comprises:

running an application corresponding to the virtual scene to present an initial page corresponding to the virtual scene; and
presenting, on the initial page corresponding to the virtual scene, the continue operation function item corresponding to the virtual scene.

13. The electronic device according to claim 11, wherein the presenting a continue operation function item for the virtual scene comprises:
presenting a first continue selection function item corresponding to the virtual scene;
presenting, in response to a trigger operation for the first continue selection function item, a continue selection interface used for selecting operation progress of a virtual scene corresponding to a current login account of the target user of the electronic device; and
presenting, in the continue selection interface, the continue operation function item corresponding to the operation progress of the current login account.

14. The electronic device according to claim 11, wherein the presenting a continue operation function item for the virtual scene comprises:
presenting a second continue selection function item corresponding to the virtual scene;
presenting, in response to a trigger operation for the second continue selection function item, a second continue selection interface used for selecting operation progress of a virtual scene corresponding to a current login account of another user different from the target user; and
presenting, in the second continue selection interface, the continue operation function item corresponding to current operation progress of a target login account, the target login account being different from a current login account.

15. The electronic device according to claim 10, wherein the receiving a save instruction used for saving progress data corresponding to current operation progress of the virtual scene operation comprises:
presenting, in a view interface used for presenting the picture of the virtual scene, a save function item corresponding to the virtual scene, the save function item being used for saving the operation progress of the virtual scene corresponding to a current login account of the target user; and
receiving, in response to a trigger operation for the save function item, a save instruction used for saving the progress data corresponding to the operation progress of the virtual scene operation.

16. The electronic device according to claim 10, wherein the receiving a save instruction used for saving progress data corresponding to current operation progress of the virtual scene operation comprises:
presenting, in response to a picture close operation instructing to close the presented picture, an information prompt window used for prompting whether to save the operation progress of the virtual scene; and
receiving, by using the information prompt window, a save instruction used for saving the progress data corresponding to the operation progress of the virtual scene operation.

17. The electronic device according to claim 10, wherein the method further comprises:
presenting a shared function item corresponding to the operation progress of the virtual scene; and
sharing the operation progress of the virtual scene corresponding to a current login account in response to a trigger operation for the shared function item with an account different from the current login account, so that the account different from the current login account is capable of presenting a picture of the virtual scene based on the operation progress of the virtual scene corresponding to the current login account.

18. The electronic device according to claim 10, wherein the transmitting a save request for the progress data to a server comprises:
   transmitting a save request for the progress data to the server, wherein the save request is generated while the target user performs a virtual scene operation on the virtual scene, and wherein the server generates, based on the save request, an archive file used for indicating the operation progress of the virtual scene operation, acquires a virtual function component used for adjusting the operation progress corresponding to the virtual scene, and renders, based on the archive file and the virtual function component, a picture of the virtual scene corresponding to the operation progress, to obtain the data snapshot that comprises progress data of the picture.

19. A non-transitory computer readable storage medium that stores executable instructions that, when executed by a processor of an electronic device, cause the electronic device to implement a method for processing data associated with a virtual scene of a gaming application, the method including:
   receiving, in a process in which a target user of the electronic device performs a virtual scene operation on the virtual scene of the gaming application, a save instruction from the target user for saving progress data corresponding to current operation progress of the virtual scene operation;
   transmitting a save request for the progress data to a server in response to the save instruction, wherein the server generates, based on the save request, an archive file used for indicating the operation progress of the virtual scene operation associated with the save instruction from the target user, and generates and stores, based on the archive file, a data snapshot of the progress data corresponding to the operation progress associated with the save instruction from the target user and a first progress level of the target user in the game application;
   transmitting an acquiring request for the progress data corresponding to the operation progress associated with the save instruction from the target user to the server in response to a picture display instruction for the operation progress from a second user of the electronic device that is different from the target user, wherein the server acquires and returns, based on the acquiring request for the progress data, the data snapshot of the progress data corresponding to the operation progress associated with the save instruction from the target user to the electronic device;
   presenting, based on the data snapshot, a picture of the virtual scene corresponding to the operation progress associated with the save instruction from the target user; and
   in response to a selection of a continue operation function item presented on the picture of the virtual scene by the second user of the electronic device,
   determining a difference between a second progress level of the second user in the game application with and the first progress level of the target user in the game application, wherein the first and second progress levels are numeric values;
   comparing the difference between the second progress level of the second user and the first progress level of the target user and a predefined threshold; and
   when a difference between the second progress level of the second user and the first progress level of the target user is less than the predefined threshold, resuming the virtual scene operation based on the operation progress associated with the save instruction from the target user by submitting a new data request to the server, wherein the server sends, based on the new data request, the archive file to the electronic device for resuming the virtual scene operation based on the operation progress for the second user.

20. The non-transitory computer readable storage medium according to claim 19, wherein the method further comprises:
   presenting a shared function item corresponding to the operation progress of the virtual scene; and
   sharing the operation progress of the virtual scene corresponding to a current login account in response to a trigger operation for the shared function item with an account different from the current login account, so that the account different from the current login account is capable of presenting a picture of the virtual scene based on the operation progress of the virtual scene corresponding to the current login account.

* * * * *